United States Patent [19]

Takahashi et al.

[11] Patent Number: 6,064,958
[45] Date of Patent: May 16, 2000

[54] PATTERN RECOGNITION SCHEME USING PROBABILISTIC MODELS BASED ON MIXTURES DISTRIBUTION OF DISCRETE DISTRIBUTION

[75] Inventors: Satoshi Takahashi, Kanagawa-ken; Shigeki Sagayama, Tokyo, both of Japan

[73] Assignee: Nippon Telegraph and Telephone Corporation, Tokyo, Japan

[21] Appl. No.: 08/934,376

[22] Filed: Sep. 19, 1997

[30] Foreign Application Priority Data

Sep. 20, 1996 [JP] Japan ................................. 8-250371

[51] Int. Cl.[7] ......................................... G10L 9/06
[52] U.S. Cl. ............................ 704/243; 704/245; 704/256
[58] Field of Search ..................................... 704/230, 243, 704/256, 245

[56] References Cited

U.S. PATENT DOCUMENTS

| 5,289,562 | 2/1994 | Mizuta et al. ................................. 395/2 |
| 5,506,933 | 4/1996 | Nitta ......................................... 704/256 |
| 5,555,320 | 9/1996 | Irie et al. .................................. 382/225 |
| 5,680,511 | 10/1997 | Baker et al. ............................... 704/255 |
| 5,787,230 | 7/1998 | Lee .......................................... 704/256 |
| 5,794,198 | 8/1998 | Takahashi et al. ........................ 704/256 |

OTHER PUBLICATIONS

Takahashi et al. Discrete Mixture HMM. ICASSP–97. 971–974, 1997.

Sagayama et al. On the use of Scalar Quantization for Fast HMM Computation. ICASSP–95; vol. 1, 1995.

Yamada, et al. (1996) "Fast Output Probability Computation Using Scalar Quantization And Independent Dimension Multi–Mixture." ICASSP96 pp. 893–896.

Primary Examiner—Emanuel Todd Voeltz
Assistant Examiner—M. David Sofocleous
Attorney, Agent, or Firm—Jones & Askew

[57] ABSTRACT

A pattern recognition scheme using probabilistic models that are capable of reducing a calculation cost for the output probability while improving a recognition performance even when a number of mixture component distributions of respective states is small, by arranging distributions with low calculation cost and high expressive power as the mixture component distribution. In this pattern recognition scheme, a probability of each probabilistic model expressing features of each recognition category with respect to each input feature vector derived from each input signal is calculated, where the probabilistic model represents a feature parameter subspace in which feature vectors of each recognition category exist and the feature parameter subspace is expressed by using mixture distributions of one-dimensional discrete distributions with arbitrary distribution shapes which are arranged in respective dimensions. Then, a recognition category expressed by a probabilistic model with a highest probability among a plurality of probabilistic models is outputted as a recognition result.

28 Claims, 16 Drawing Sheets

DISCRETE MIXTURE DISTRIBUTION

CONTINUOUS MIXTURE DISTRIBUTION

DISCRETE MIXTURE DISTRIBUTION

FIG.14

(a)
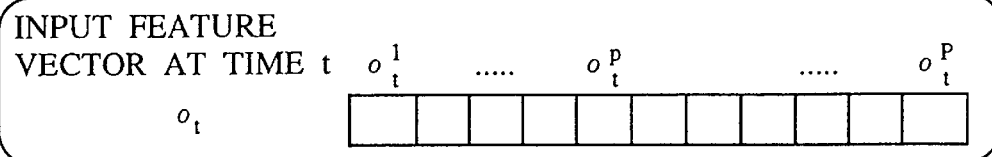
INPUT FEATURE VECTOR AT TIME t $o_t$    $o_t^1$ ..... $o_t^p$ ..... $o_t^P$

(b)
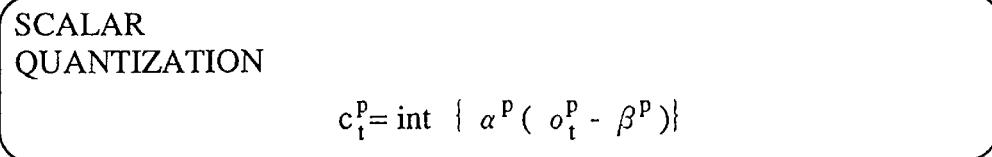
SCALAR QUANTIZATION $$c_t^p = \text{int}\{\alpha^p(o_t^p - \beta^p)\}$$

(c)
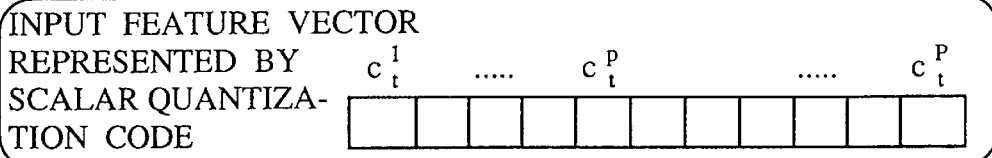
INPUT FEATURE VECTOR REPRESENTED BY SCALAR QUANTIZATION CODE    $c_t^1$ ..... $c_t^p$ ..... $c_t^P$

(d)
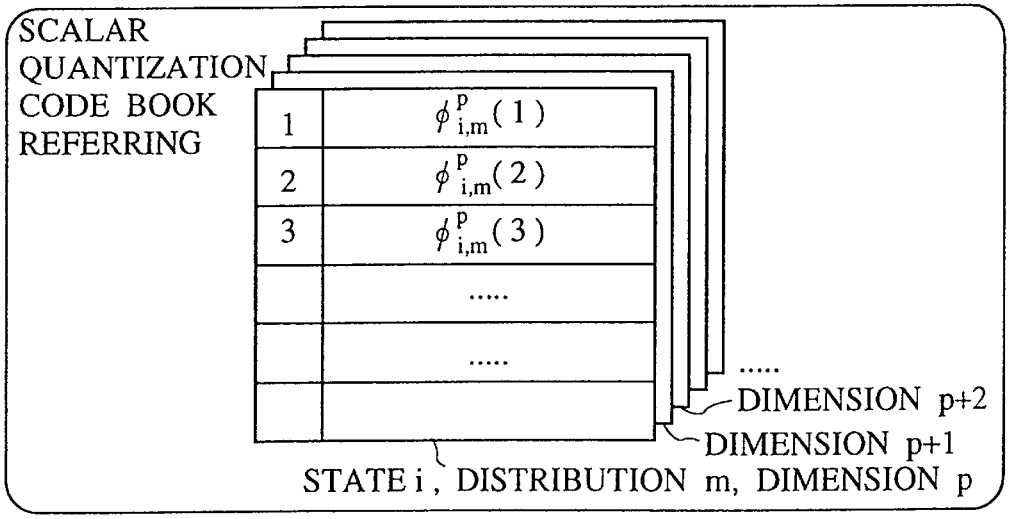
SCALAR QUANTIZATION CODE BOOK REFERRING

| 1 | $\phi_{i,m}^p(1)$ |
| 2 | $\phi_{i,m}^p(2)$ |
| 3 | $\phi_{i,m}^p(3)$ |
|   | ..... |
|   | ..... |

DIMENSION p+2
DIMENSION p+1
STATE i, DISTRIBUTION m, DIMENSION p

(e)
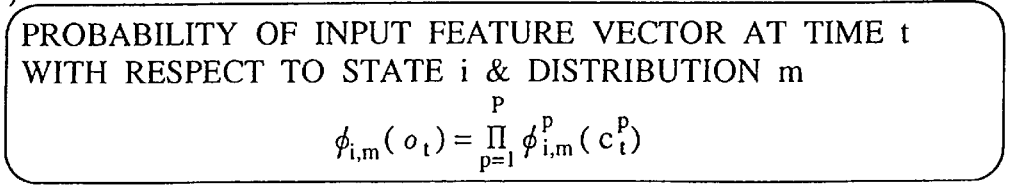
PROBABILITY OF INPUT FEATURE VECTOR AT TIME t WITH RESPECT TO STATE i & DISTRIBUTION m $$\phi_{i,m}(o_t) = \prod_{p=1}^{P} \phi_{i,m}^p(c_t^p)$$

PATTERN RECOGNITION SCHEME USING PROBABILISTIC MODELS BASED ON MIXTURES DISTRIBUTION OF DISCRETE DISTRIBUTION

BACKGROUND OF THE INVENTION

1. Field of the Invention

The present invention relates to a pattern recognition scheme in which feature parameters (feature vectors) of each recognition category are modelled by probabilistic models, and a recognition of an input data is realized by obtaining a probability of each probabilistic model with respect to an input feature vector sequence. The Pattern recognition scheme can be used for automatic speech recognition, automatic character recognition, automatic figure recognition, etc.

2. Description of the Background Art

A pattern recognition scheme using probabilistic models based on the probabilistic and statistical method is a useful technique in the pattern recognition of speech, character, figure, etc. In the following, the prior art using the hidden Markov model (abbreviated hereafter as HMM) will be described for an exemplary case of the speech recognition.

In the conventional speech recognition, the method for modelling each recognition target speech unit (phoneme, syllable, word, etc.) by using the HMM in advance is the mainstream of the present-day speech recognition. FIG. 1 shows an exemplary conventional speech recognition apparatus using HMM. In this conventional speech recognition apparatus of FIG. 1, a speech entered from an input terminal 21 is converted into digital signals by an A/D conversion unit 22. Then, speech feature vectors are extracted from the digital signals at a speech feature vector extraction unit 23. Then, the HMMs generated for each speech unit (phoneme, syllable, word, etc.) to be recognized in advance are read out from an HMM memory 24, and a probability of each model with respect to the input speech is calculated at a model probability calculation unit 25. Then, a speech unit represented by a model with the highest probability is outputted from a recognition result output unit 26 as a recognition result.

In the statistical (or probabilistic) model such as HMM, there is a trade-off between the degree of freedom of a model (a model's expressive power or a number of parameters expressed by a model) and an amount of training data.

Namely, if the degree of freedom is increased while an amount of training data is small, the model would express some features which are not essential for the pattern recognition. As a result, a recognition error would be caused even for those data which are only slightly different from the training data. For example, suppose that upon observing the training data it was revealed that a certain region of data is missing so that there is a valley in a part of the probability distribution. When an amount of training data is small, it is highly likely that this valley is caused because data in that region were not observed. Consequently, a higher recognition precision can be realized by lowering the degree of freedom of the model and applying the smoothing according to the surrounding data, rather than expressing this valley precisely by using a high degree of freedom model. On the other hand, if the degree of freedom of the model is low despite of a large amount of data available, it would not be possible to obtain a sufficient expressive power and realize a high recognition performance. Therefore, there is a need to express the statistical model by an ample degree of freedom in view of the amount of training data.

Conventionally, in the field of speech recognition, the models with a rather low degree of freedom have been used because the amount of training speech data has been insufficient. But, in recent years, in conjunction with the expansion of the available amount of training data, there is a trend for generating models with a higher recognition performance by using a higher degree of freedom. For example, there is an acoustic model which is built by the speech data acquired from ten thousand persons.

However, no technique for dealing with such a changed state of matter regarding an amount of training data has been available so far, and the only available technique has been a simple extension of the conventional technique (such as an increase of a number of parameters). Therefore there has been a demand for a new modelling method that can deal with a case where the amount of training data is abundant.

FIG. 2 shows an example of the HMM in three states. A model like this is generated for each speech unit (recognition category, that is, phoneme, syllable, word or sentence). To states S1 to S3, the probabilistic distributions D1 to D3 of the speech feature vectors are assigned respectively. For example, when this is the phoneme model, the first, second and third states express the probabilistic distributions of the feature vectors around a starting point of a phoneme, around a center of a phoneme, and around an ending point of a phoneme, respectively.

The present invention relates to a method for expressing the distribution for the feature vectors (feature parameter distribution) in each state, so that the prior art techniques regarding such an expression method will now be described.

FIG. 3 shows an exemplary feature parameter distribution. For the sake of simplicity, it is assumed that the feature vector is expressed by a two-dimensional vector. A region in which feature vectors of a training data for a certain recognition category exists is shown as a shaded region. In addition, the feature parameter distribution of FIG. 3 actually has a three-dimensional distribution shape in which a portion with many feature vectors appears as a mountain, so that what is expressed by the entire distribution shape appears as a range of mountains with a plurality of peaks. In practice, the feature vectors have 30 or so dimensions and the distribution shape is very complicated.

One example of a method for expressing the distribution is a discrete distribution expression based on the vector quantization, which will now be described with reference to FIG. 4. In FIG. 4, the distribution is expressed by arranging representative points (vector quantization points, indicated by dots in FIG. 4) in a feature vector space (represented as a two-dimensional space in FIG. 4), and changing a probability value (weight coefficient) for each representative point. At a time of recognition, the probability value is obtained by calculating a distance for the purpose of checking a quantization point that is closest to an input feature vector.

When the distribution for each recognition category is expressed by using a common quantization point set for all the recognition categories and changing only probability values, it suffices to carry out a calculation for finding the quantization point closest to the input feature vector only once. However, as shown in FIG. 5, even when four vector quantization points share a part of their elements in the dimension-1 and dimension-2, for example, these four vector quantization points must be treated independently so that the efficiency of the expression is poor. At a time of training, it is necessary to count a number of training data allocated to each quantization point, so that there is a problem that a huge number of quantization points must be arranged and a large amount of training data must be used in order to realize an accurate distribution expression. In addition, there is also a problem that an error between the input feature vector and the vector quantization point allocated thereto can lower the accuracy.

Another example of a method for expressing the distribution is a continuous distribution expression based on the multi-dimensional diagonal Gaussian distribution, which will now be described with reference to FIG. 6. In FIG. 6, the distribution in the multi-dimensional space is expressed in a product space of the Gaussian distributions of respective dimensions, using Gaussian distributions as peripheral distributions and assuming that there is no correlation among dimensions. The Gaussian distribution is a parametric distribution that can be expressed by a mean and a variance, so that it is possible to expect an effect of smoothing the distribution shape and providing a limited degree of freedom. However, the distribution expressed in the product space is a distribution which is parallel to an axis of each dimension, so that there is a problem that the distribution as shown in FIG. 3 cannot be expressed. Also, the Gaussian distribution is a single peak distribution, so that one distribution can only express one peak.

In order to resolve this problem, there is an expression method using a mixture distribution of the multi-dimensional diagonal Gaussian distributions (which will be referred to as a continuous mixture distribution hereafter), which will now be described with reference to FIG. 7. In FIG. 7, the distribution to be expressed is divided into a plurality of regions and each region is expressed by the Gaussian distribution. This is the currently most popular method. The recognition scheme utilizing the multi-dimensional continuous mixture distribution is disclosed in U.S. Pat. No. 4,783,804, for example.

However, even in this method, when the distribution to be expressed has a very complicated shape and many peaks, there is a problem that it is necessary to arrange at least as many distributions as a number of peaks to be expressed. An increase in a number of distributions leads to an increase in an amount of calculation.

An output probability $b_i(o_t)$ for an input feature vector $o_t=(o_{t1}, o_{t2}, \ldots, o_{tP})$ (where P is a total number of dimensions) of a time t in the mixture Gaussian distribution type HMM of a state i can be given by:

$$b_i(o_t) = \sum_{m=1}^{M} w_{i,m} \phi_{i,m}(o_t) \quad (1)$$

where $w_{i,m}$ is a weight coefficient for the m-th multi-dimensional Gaussian distribution of a state i. The probability density for the multi-dimensional Gaussian distribution m is given by:

$$\phi_{i,m}(o_t) = \frac{1}{\sqrt{(2\pi)^P |\Sigma_{i,m}|}} \exp\left(-\frac{(o_t - \mu_{i,m})^T \Sigma_{i,m}^{-1} (o_t - \mu_{i,m})}{2}\right) \quad (2)$$

where $\mu_{i,m}$ is a mean vector of the m-th multi-dimensional Gaussian distribution of a state i, $\Sigma_{i,m}$ is a covariance matrix of the m-th multi-dimensional Gaussian distribution of a state i, and T denotes a transpose of a matrix. Assuming that the covariance matrix only has diagonal components (a diagonal covariance matrix), the log of $\phi_{i,m}(o_t)$ is given by:

$$\log \phi_{i,m}(o_t) = \sum_{p=1}^{P} \left(-\frac{1}{2}\log 2\pi - \frac{1}{2}\log \sigma_{i,m,p}^2 - \frac{(o_{t,p} - \mu_{i,m,p})^2}{2\sigma_{i,m,p}^2}\right) \quad (3)$$

where $\mu_{i,m,p}$ is the p-th component of the mean vector of the m-th multi-dimensional Gaussian distribution of a state i, and $\sigma_{i,m,p}^2$ is the p-th diagonal component (variance) of the covariance matrix of the m-th multi-dimensional Gaussian distribution of a state i.

This calculation is carried out for the feature vector of each time of the input speech, with respect to the recognition candidate models, and the recognition result is outputted according to the obtained log probability.

There is also a method which uses the scalar quantization in order to reduce a calculation time for the continuous mixture distribution (see, M. Yamada et al.: "Fast Output Probability Computation using Scalar Quantization and Independent Dimension Multi-Mixture", Proc. of ICASSP96, pp. 893–896). In this method, after the continuous mixture distribution type model is trained, a plurality of Gaussian distributions are combined into one distribution in each dimension, and the discrete distribution expression based on the scalar quantization is obtained, as shown in FIG. 8. However, the combined distribution in each dimension is nothing but a discrete expression of the original continuous mixture distribution, and the distribution shape remains at the same or the lower accuracy level.

In addition, the product space is accounted after the distributions are combined in each dimension, so that the combined distribution will also cover those regions not belonging to the training data used for the distribution estimation, and this can cause a lowering of the recognition performance.

As described, the conventionally used Gaussian distributions are appropriate in expressing relatively simple distribution shapes. But, in recent years, in conjunction with the expansion of the training speech database, there is a need to express more complicated distribution shapes in order to obtain more accurate models. Since the Gaussian distribution has a limited degree of freedom, it is necessary to use many mixture component distributions in order to express a detailed distribution shape. For this reason, there is a problem that a number of the mixture component distributions M in the above equation (1) becomes large and an amount of calculation for the output probability is increased.

For example, when a model based on 4 mixture distributions is upgraded to a model based on 32 mixture distributions, an amount of calculation will be increased 8 times larger, even though the recognition precision can be improved. Even in a typical example of the conventional speech recognition apparatus, a time required for the output probability calculation consumes 45% to 60% of the total processing time of the speech recognition, and this already time consuming processing will become even more computationally loaded processing when a number of mixture distributions increases. Thus there is a problem that the increased number of mixture distributions hinders the realization of the real time processing, despite of the fact that the real time processing is an important factor from a viewpoint of its use as a human interface,

SUMMARY OF THE INVENTION

It is therefore an object of the present invention to provide a pattern recognition scheme using probabilistic models that are capable of reducing a calculation cost for the output probability while improving a recognition performance even when a number of mixture component distributions of respective states is smaller than a case of using the conventional continuous mixture distributions, by arranging distributions with low calculation cost and high expressive power as the mixture component distribution.

The pattern recognition scheme of the present invention is basically characterized by a use of models using discrete distributions as mixture component distributions. The models in the present invention differ from the conventional multi-dimensional diagonal continuous mixture distribution model in that the component distributions of each dimension are given in forms of the discrete distributions instead of the continuous distributions (Gaussian distributions). The model is expressed by arranging a plurality of one-dimensional discrete distributions in each dimension and using the probability corresponding to the scalar quantization codes for each distribution.

In the pattern recognition scheme of the present invention, the non-parametric discrete distribution is used as each mixture component distribution, so that the higher expressive power than the continuous distribution (parametric distribution) can be obtained, and the calculation cost is lower than the continuous distribution. Therefore it is possible to realize the model with the reduced cost for calculation of the output probability while maintaining the same recognition performance as the continuous distribution case. In other words, the expressive power of each mixture component distribution is higher than the prior art so that it is possible realize the recognition performance higher than that realizable by the conventional model with the same number of mixture distributions.

Other features and advantages of the present invention will become apparent from the following description taken in conjunction with the accompanying drawings.

BRIEF DESCRIPTION OF THE DRAWINGS

FIG. 14 is a sequence diagram for explaining a procedure of a probability calculation by a model probability calculation unit in the pattern recognition apparatus of FIG. 13.

DETAILED DESCRIPTION OF THE PREFERRED EMBODIMENTS

Referring now to FIG. 9 to FIG. 22, various embodiments of a pattern recognition scheme according to the present invention will be described.

First, with references to FIG. 9 to FIG. 12, the basic principle of the present invention will be described in detail.

The pattern recognition scheme of the present invention is basically characterized by a use of models using discrete distributions as mixture component distributions. The models in the present invention differ from the conventional multi-dimensional diagonal continuous mixture distribution model in that the component distributions of each dimension are given in forms of the discrete distributions instead of the continuous distributions (Gaussian distributions). The model is expressed by arranging a plurality of one-dimensional discrete distributions in each dimension and using the probability corresponding to the scalar quantization codes for each distribution.

The probability $b_i\text{-}(o_t)$ of a state corresponding to a feature vector $o_t$ at time t is given as follows. First, the feature vector $o_t$ is scalar quantized in each dimension. Then, by referring to a scalar quantization code book according to a scalar quantization code $c_t^p$ of a dimension p, the probability $\phi_{i,m}(o_t)$ of a discrete mixture component distribution m is calculated as follows.

$$\phi_{i,m}(o_t) = \prod_{p=1}^{P} \phi_{i,m}^p(c_t^p) \quad (4)$$

where P is a total number of dimensions. Then, the probability $b_i(o_t)$ is obtained by calculating a sum of probabilities for all the mixture component distributions as follows.

$$b_i(o_t) = \sum_{m=1}^{M} w_{i,m} \phi_{i,m}(o_t) \quad (5)$$

where $w_{i,m}$ is a weight coefficient for a mixture component m of a state i, and M is a total number of mixture components within each state.

Figure 1:
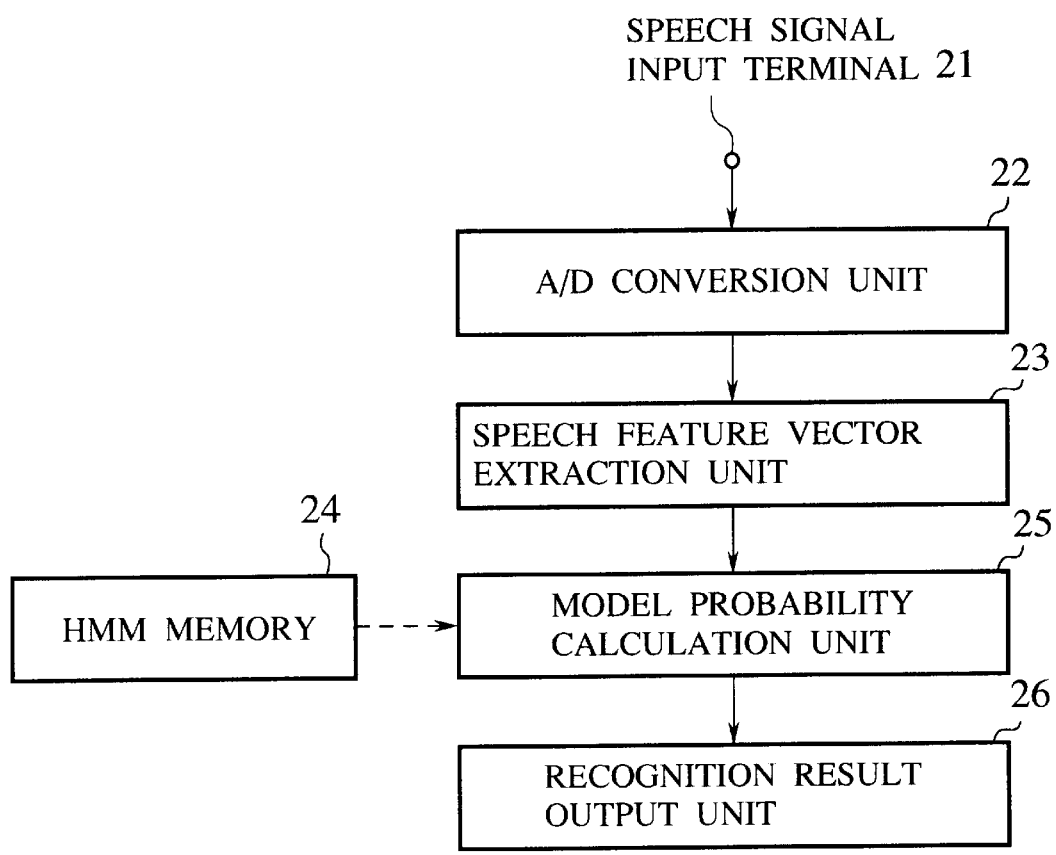
FIG. 1 is a block diagram of an exemplary conventional pattern recognition apparatus using HMM.
Figure 2:
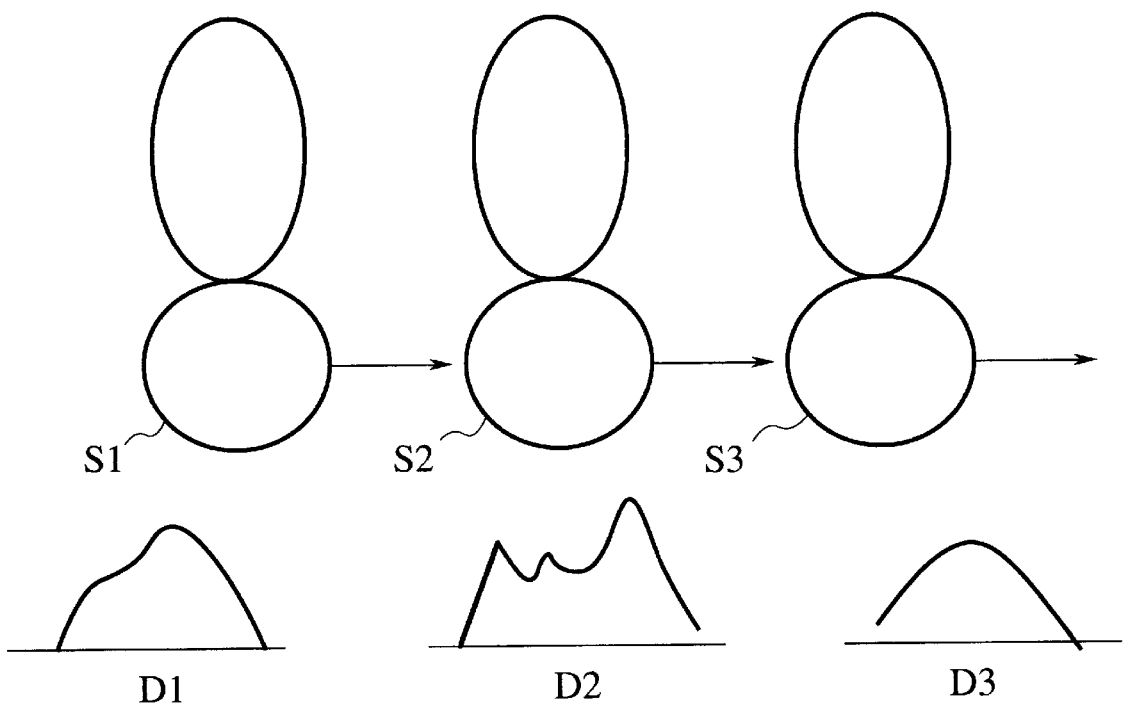
FIG. 2 is a diagram showing an exemplary HMM in three states.
Figure 3:
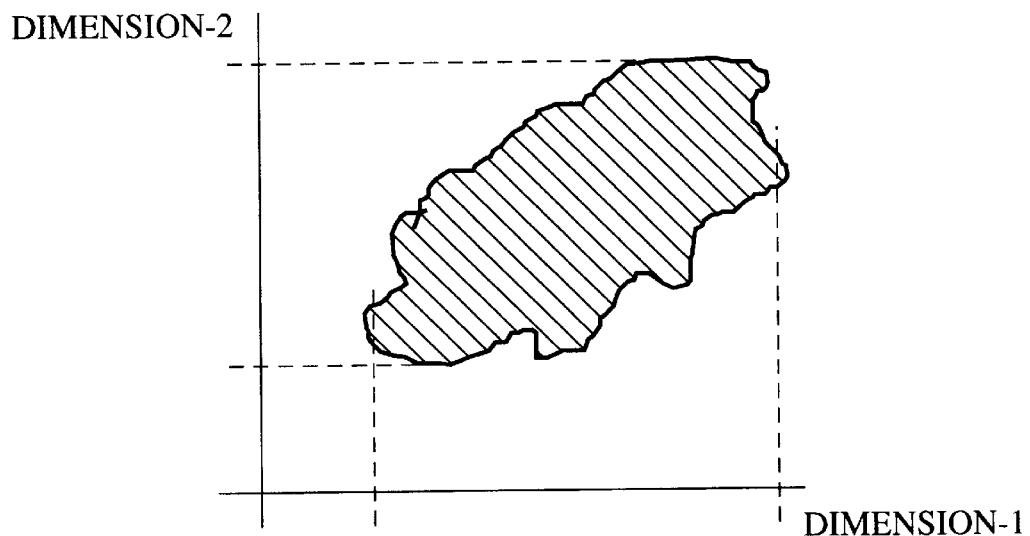
FIG. 3 is a diagram showing an exemplary feature parameter distribution.
Figure 4:
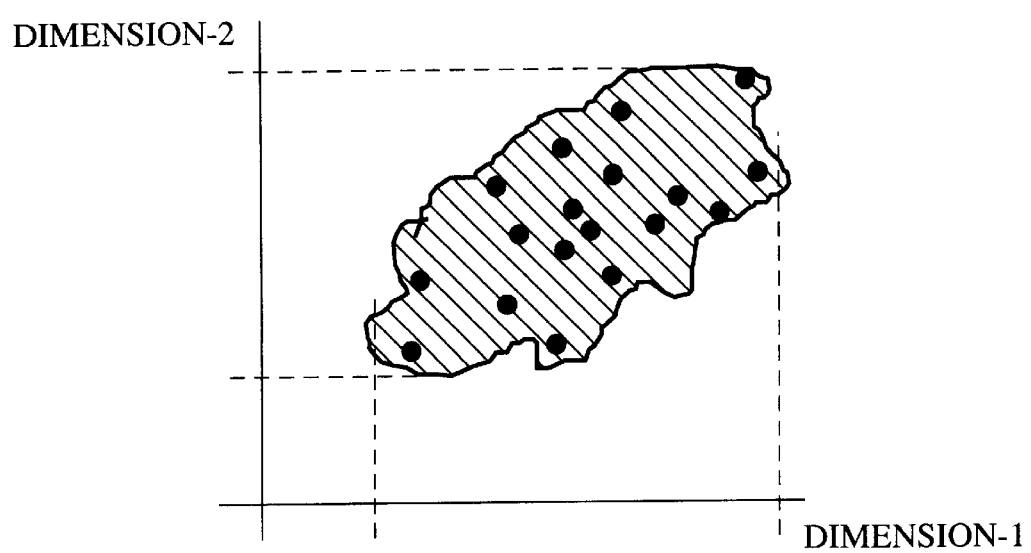
FIG. 4 is a diagram showing a feature parameter distribution according to a conventional discrete distribution expression based on the vector quantization.
Figure 5:
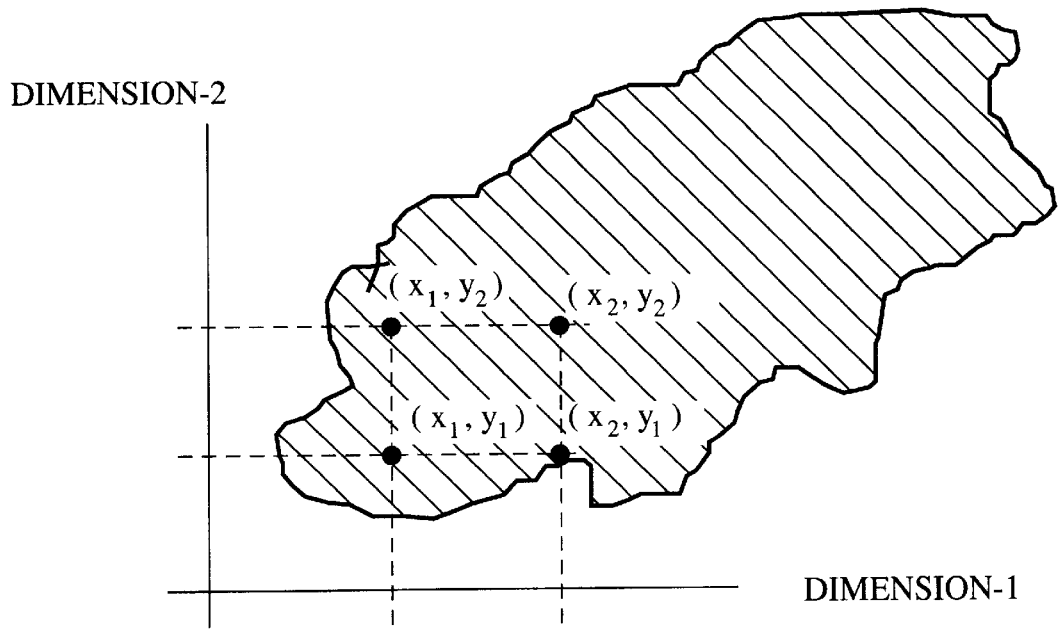
FIG. 5 is a diagram showing a feature parameter distribution for explaining a problem associated with a conventional discrete distribution expression based on the vector quantization.
Figure 6:
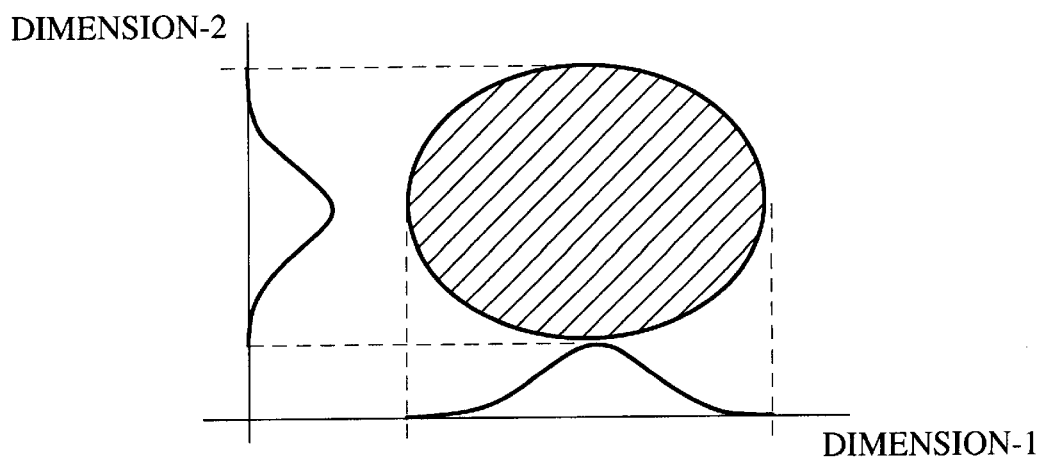
FIG. 6 is a diagram showing a feature parameter distribution according to a conventional continuous distribution expression based on the multi-dimensional diagonal Gaussian distribution.
Figure 7:
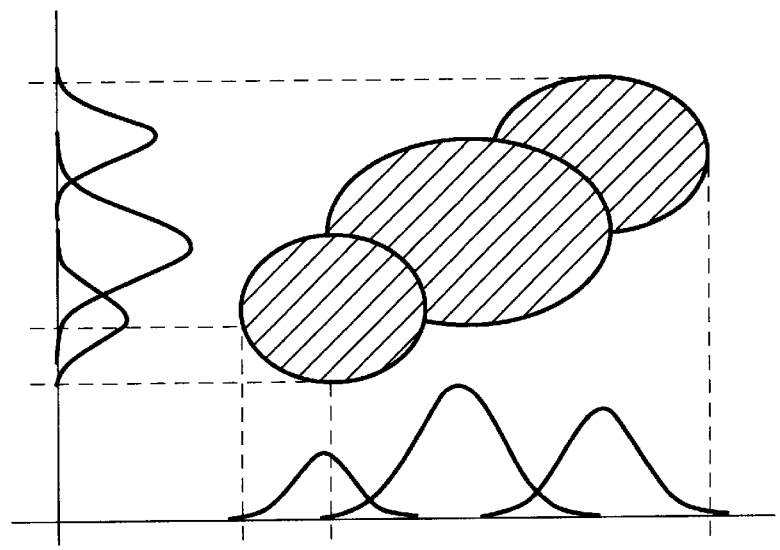
FIG. 7 is a diagram showing a feature parameter distribution according to a conventional expression method using a mixture distribution of the multi-dimensional diagonal Gaussian distributions (continuous mixture distribution).
Figure 8:
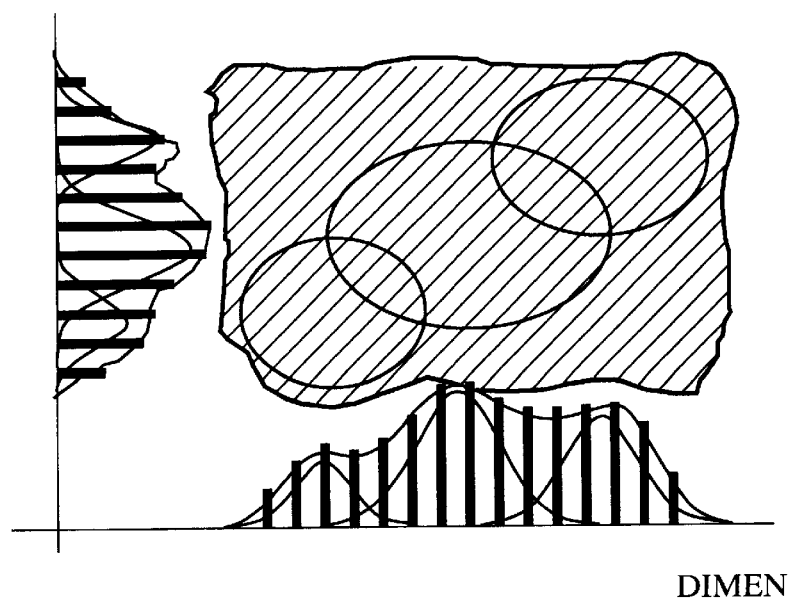
FIG. 8 is a diagram showing a feature parameter distribution according to a conventional method which uses the scalar quantization in order to reduce a calculation time for the continuous mixture distribution.
Figure 9:
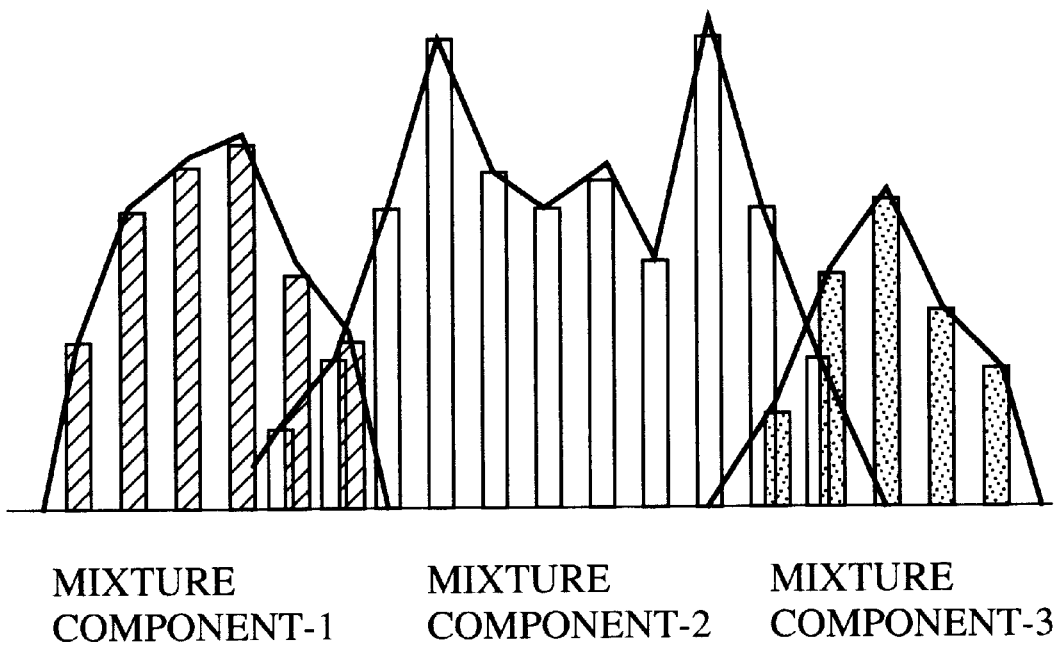
FIG. 9 is a diagram showing an example of a discrete mixture distribution used in the pattern recognition scheme of the present invention.
Figure 10:
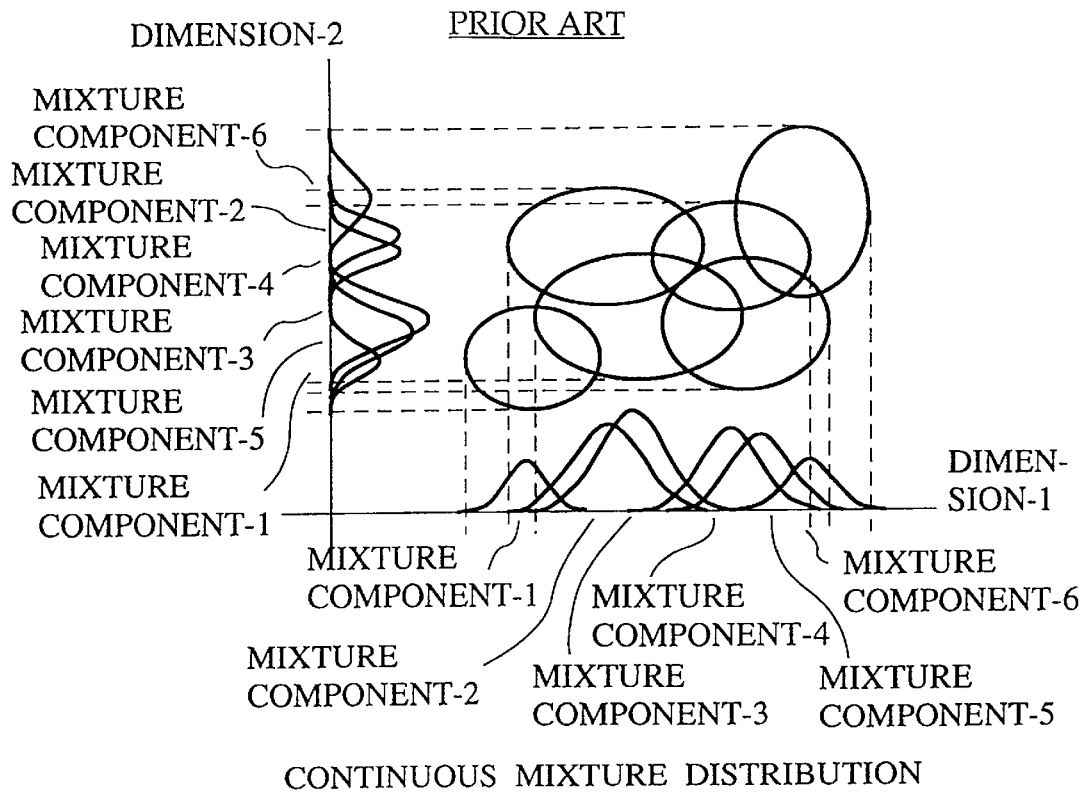
FIG. 10 is a diagram showing an exemplary continuous mixture distribution in two-dimensional space.
Figure 11:
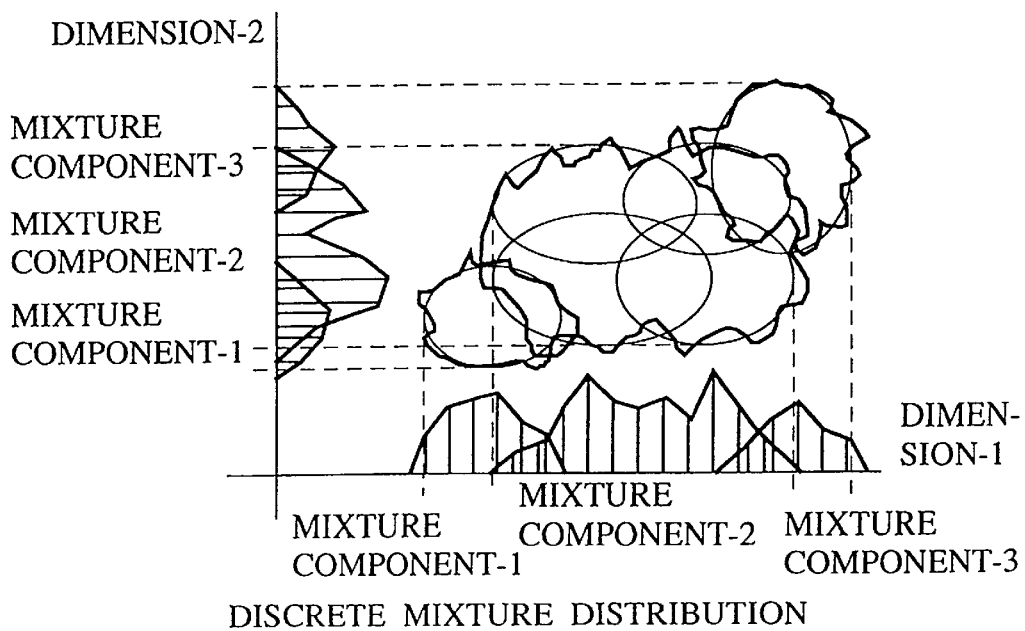
FIG. 11 is a diagram showing an exemplary discrete mixture distribution in two-dimensional space.

The discrete distribution has higher degree of freedom and expressive power than the continuous distribution. An example of a discrete mixture distribution is shown in FIG. 9. As can be seen from FIG. 9, the discrete mixture distribution of FIG. 9 has a higher degree of freedom than the continuous mixture distribution, and is capable of expressing an arbitrary shape. Exemplary mixture distributions in two-dimensional space are shown in FIG. 10 and FIG. 11, where the continuous mixture distribution of FIG. 10 requires six Gaussian distributions in each dimension but the discrete mixture distribution of FIG. 11 requires only three discrete distributions in each dimension. The discrete distribution is useful in expressing a complicated distribution because the discrete distribution has a higher degree of freedom than the continuous distribution and is capable of expressing an arbitrary shape as described above. Consequently, when an amount of training data is sufficient, there is a possibility for realizing the same performance level by using a smaller number of mixture distributions. In other words, when the number of mixture distributions is the same, the discrete distribution type models can be expected to realize a higher performance level than the continuous distribution type models.

Figure 12:
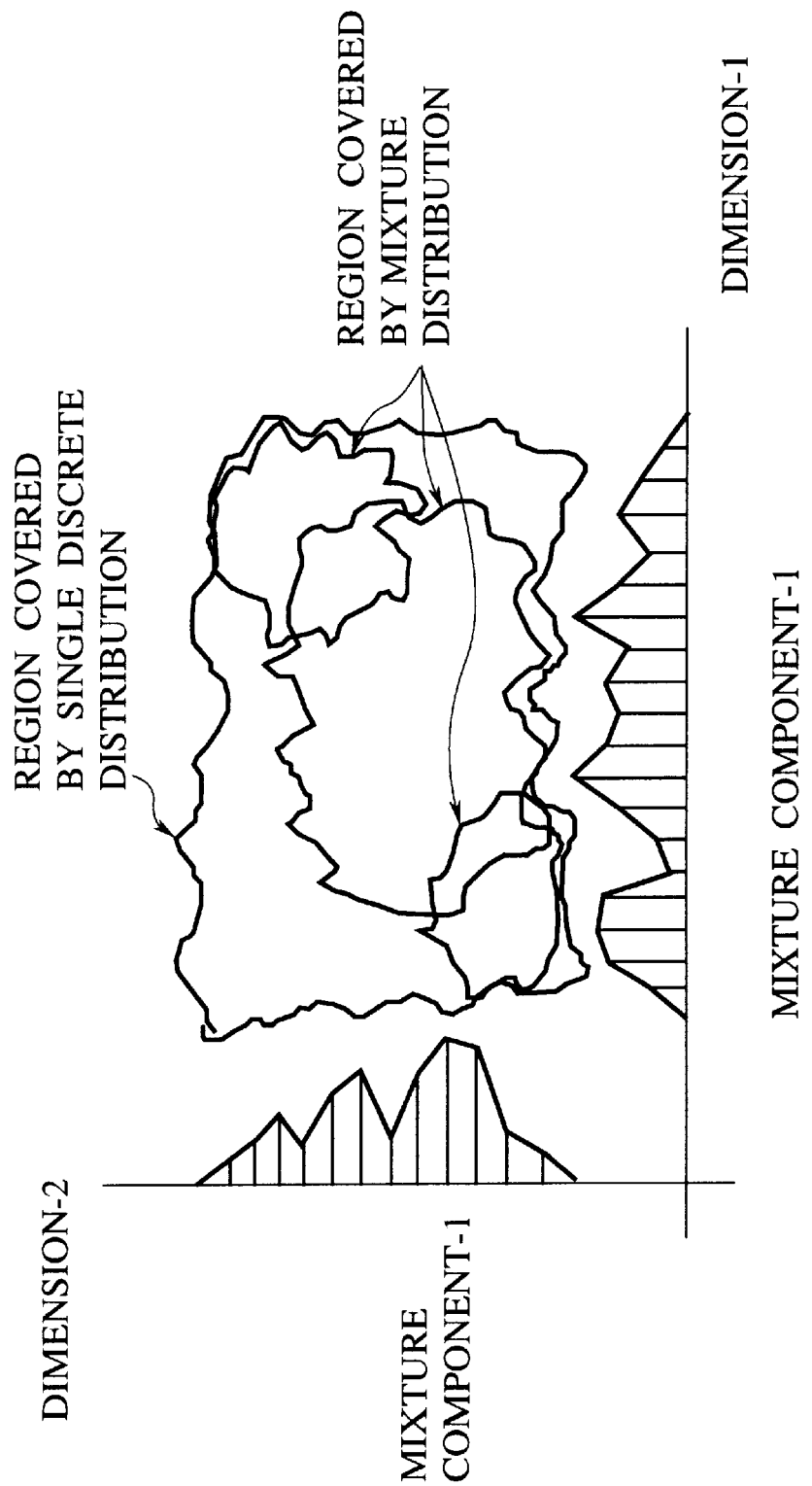
FIG. 12 is a diagram showing an example of a single discrete distribution in two dimensional space.

Next, the reason why it is necessary to form the mixture distribution by using the discrete distributions will be explained. FIG. 12 shows an example of a single discrete distribution in each dimension. The multi-dimensional space is expressed by a product space of distributions in respective dimensions so that when the multi-dimensional space is expressed by a single distribution in each dimension, those regions in which no data actually exists will also be covered. This can cause an overlap among distributions for different categories so that a lowering of the recognition performance can be caused. In FIG. 12, the outermost line indicates a region expressed by a single discrete distribution in each dimension, while a set of inner regions indicates a region expressed by the mixture distribution. By using the mixture distribution, it becomes possible to express the multi-dimensional space more accurately and therefore it becomes possible to realize a higher recognition rate.

Moreover, in general, the output probability calculation cost of the discrete distribution is less than that of the continuous distribution. Namely, as indicated in the above equation (4), the feature vector $o_t$ at each time t is scalar quantized in each dimension first. Here, it suffices to carry out the scalar quantization only once for each input frame, when using a common scalar quantization code book for all distributions existing in the models. For example, for the linear scalar quantization, the scalar quantization code $c_t^p$ can be easily obtained by a calculating $\text{int}\{\alpha^p(o_t^p - \beta^p)\}$ ($o_t^p$ is a dimension-p element of the observation vector, $\alpha^p$ is an inverse of a dimension-p step width, $\beta^p$ is a bias, and $\text{int}\{\}$ is an integer calculation for obtaining the nearest integer value) in each dimension p. Even in a case of the non-linear quantization, the scalar quantization code can be obtained efficiently by using the code book described by a tree structure. Finally, by referring to the scalar quantization code book according to the scalar quantization code, the probability $\phi_{i,m}^p(o_t^p)$ for each discrete mixture component distribution is obtained. By comparing the equation (4) with the equation (2) or (3), it should be apparent that a required amount of calculation is much smaller for the scheme of the present invention.

Referring now to FIG. 13 to FIG. 18, one embodiment of a pattern recognition scheme according to the present invention will be described in detail.

Figure 13:
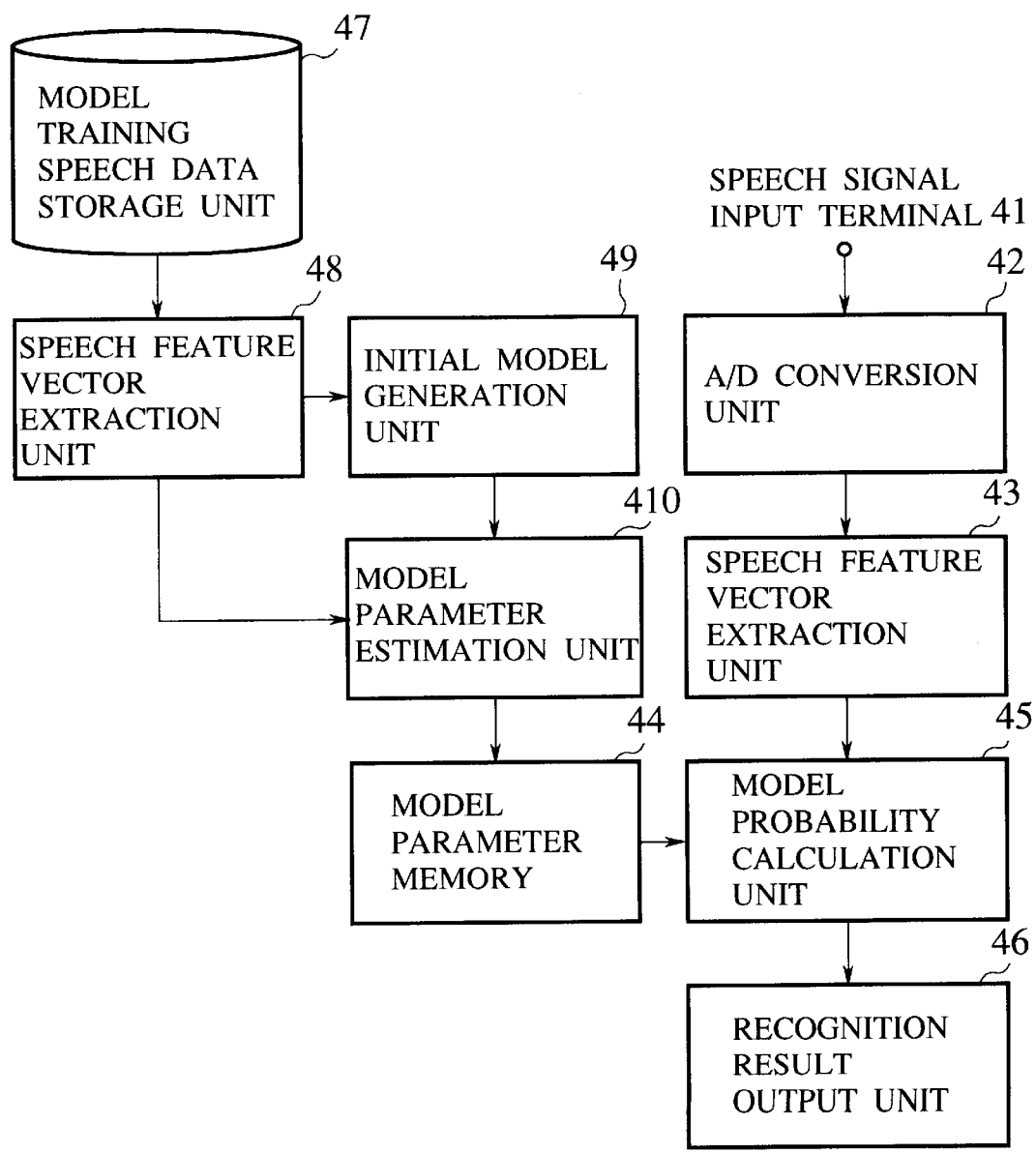
FIG. 13 is a block diagram of a pattern recognition apparatus according to one embodiment of the present invention.

FIG. 13 shows a configuration of a pattern recognition apparatus in this embodiment of the present invention. This pattern recognition apparatus of FIG. 13 comprises: an A/D conversion unit 42 for converting speech signals entered from a speech signal input terminal 41 into digital signals; a speech feature vector extraction unit 43 for extracting speech feature vectors from the digital signals; a model probability calculation unit 45 for calculating a probability (likelihood) with respect to each model; a recognition result output unit 46 for outputting a speech unit represented by a model with the highest probability as a recognition result; a model training speech data storage unit 47 for storing model training speech data; a speech feature vector extraction unit 48 for extracting speech feature vectors from the model training speech data given from the model training speech data storage unit 47; an initial model generation unit 49 for generating initial models by using the speech feature vectors extracted from the model training speech data; a model parameter estimation unit 410 for estimating model parameters of the initial models generated by the initial model generation unit 49 and the speech feature vectors extracted by the speech feature vector extraction unit 48; and a model parameter memory 44 for storing parameter estimation results obtained by the model parameter estimation unit 410.

The initial model generation unit 49 generates the initial model for each recognition category by the following procedure.

(1) The continuous distribution type model with the desired number of distributions to be mixed is trained by using the model training speech data given from the model training speech data storage unit 47.

(2) In order to discretize one-dimensional continuous distribution of each dimension so as to obtain a discrete distribution, the number of scalar quantization points are determined beforehand. Here, a scalar quantization range of data in each dimension is defined as follows.

$$\left( \min_{k=1,\cdots,K}(\mu_{ki} - 3\sigma_{ki}), \max_{k=1,\cdots,K}(\mu_{ki} + 3\sigma_{ki}) \right) \quad (6)$$

where $\mu_{ki}$ and $\sigma_{ki}$ are a mean and a variance of the k-th one-dimensional continuous distribution in the i-th dimension, and K is the total number of distributions in the model.

(3) The above range is evenly divided by the number of quantization points to obtain the step width for the quantization, and a scalar quantizer $\text{int}\{\alpha^p(o_t^p - \beta^p)\}$ ($o_t^p$ is a dimension-p element of the feature vector, $\alpha^p$ is an inverse of a dimension-p step width, $\beta^p$ is a bias, and $\text{int}\{\}$ is an integer calculation) for a distribution in each dimension p is designed.

(4) In each mixture component distribution of the continuous distribution type model, probability densities for the quantization points located within a range of $\mu \pm 3\sigma$ are calculated by using the centroid values (quantization points) so as to obtain discrete probabilities. Then, a sum of the discrete probabilities of the respective distributions is normalized to 1.0. As for the state transition probability and the mixture coefficients, the same values as in the original continuous distribution type model are used.

Note that the scalar quantizer is designed for each dimension separately here, but this is not absolutely necessary. For example, it is also possible to design one scalar quantizer that can be commonly used for all the dimensions. In that case, a memory region for storing the scalar quantization code book can be reduced to 1/(number of dimensions). It is also possible to design the scalar quantizer that can be common to all models, or the scalar quantizer that can be shared among the similar models or similar distributions. By increasing a number (variation) of scalar quantizers, it becomes possible to express the distribution shape more accurately, whereas by sharing the scalar quantizer, a memory region for storing the quantization code books can be reduced.

Note also that, in the example described above, the scalar quantization range is defined as $\mu \pm 3\sigma$, but the definition of the scalar quantization range is not necessarily limited to this example.

The model parameter estimation unit 410 carries out the maximum likelihood re-estimation of the output probability distributions in the discrete mixture distribution type model. Here, a probability for being in a state i at time t and in a mixture distribution m of a state j at time t+1 is denoted as $\xi_t (i, j, m)$ which is given as follows.

$$\xi_t(i, j, m) = \frac{P(q_t = i, q_{t+i} = j, m, 0|\lambda)}{P(0|\lambda)} \quad (7)$$
$$= \frac{\alpha_t(i) a_{ij} \phi_{j,m}(o_{t+1}) \beta_{t+i}(j)}{P(0|\lambda)}$$

where $\alpha_t (i)$ and $\beta_{t+1} (j)$ are forward probability and backward probability, respectively, and $\phi_{j,m} (o_{t+1})$ is as defined by the equation (4). The re-estimation formula for the discrete output probability distributions is given as follows.

$$\overline{\phi}^P_{j,m}(k) = \frac{\sum_{t=1}^{T} \sum_{i=1}^{N} \xi_t(i, j, m) \delta(c_t^P, v_k^P)}{\sum_{t=1}^{T} \sum_{i=1}^{N} \xi_t(i, j, m)} \quad (8)$$

$$\delta(c_t^P, v_k^P) = \begin{cases} 1 & \text{(if } c_t^P = v_k^P\text{)} \\ 0 & \text{(otherwise)} \end{cases} \quad (9)$$

where $v_k^P$ is the scalar quantization code of the k-th quantization point. Note that the re-estimation formula for the state transition probabilities and the mixture coefficients are the same as those in a case of the continuous mixture distribution. The parameter estimation result is stored in the model parameter memory 44.

The data to be recognized is entered from the speech signal input terminal 41, and converted into the digital signals at the A/D conversion unit 42. Then, feature vectors of about 10-th to 16-th order is calculated at the speech feature vector extraction unit 43, and the probability (likelihood) with respect to each model is calculated at the model probability calculation unit 45. Here the probability calculation is carried out according to the procedure shown in FIG. 14 as follows.

Namely, when an input feature vector at time t is entered ((a) of FIG. 14), each element of the input feature vector is scalar quantized by using the same scalar quantizer as used in the initial model generation ((b) and (c) of FIG. 14). Next, the already provided scalar quantization code book reflecting the training result for each mixture component distribution of each dimension in each state is referred and the probability corresponding to the scalar quantization code is looked up ((d) of FIG. 14). Then, the product of the probabilities for all dimensions is calculated according to the above equation (4) as a probability of the input feature vector with respect to each mixture component distribution ((e) of FIG. 14).

After this probability calculation, a sum of the probabilities of all the mixture component distributions within the state is calculated. Here it is also possible to use the highest probability among all the distributions as the probability of the state instead of using a sum of the probabilities of all the distributions. Finally, the model with the highest probability is selected, and category corresponding to the model with the highest probability is outputted at the recognition result output unit 46.

Now, with references to FIG. 15 to FIG. 18, the operation of the pattern recognition apparatus of FIG. 13 will be described in detail.

First, the processing for generating a model for the purpose of the pattern recognition in the pattern recognition apparatus of FIG. 13 is carried out according to the flow chart of FIG. 15 as follows.

Namely, the training data are read out from the model training speech data storage unit 47 (step S21), and using the speech feature vectors obtained by the speech feature vector extraction unit 48, the continuous mixture distribution type model is trained at the initial model generation unit 49 for the purpose of generating the initial model of the discrete mixture distribution type model to be used in the present invention (step S22). For the model training (parameter updating), the maximum likelihood re-estimation method is used. This method is the repetitive training method, and the training is to be continued until an update of the model likelihood with respect to the training data meets the predetermined criteria (step S23).

By generating the initial model of the discrete mixture distribution from the continuous mixture distribution type model, it is possible to realize an effect that the initial discrete distributions can be appropriately arranged roughly at regions at which data exist. Unless the initial discrete distributions are given appropriately, there is a great possibility for falling into a local optimum point of the parameter so that the globally optimum parameter cannot be obtained. Also, a number of mixture component distributions in the continuous mixture distribution type model may be as many as a number required in the discrete mixture distribution type model to be obtained, but it is also possible to train the model with more number of distributions than required first, and then merge the distributions until a number of distributions becomes a required number. When there is a sufficient amount of training data, a model with more number of mixture distributions can realize more detailed distribution expression, so that the appropriate initial distributions can be obtained by starting from a model with more number of mixture distributions and reducing a number of distributions by merging.

Next, the design of the scalar quantizer for the purpose of discretizing the continuous distributions into the discrete distributions is carried out (step S24). In further detail, this scalar quantizer designing processing is carried out according to the flow chart of FIG. 16 as follows.

Figure 16:
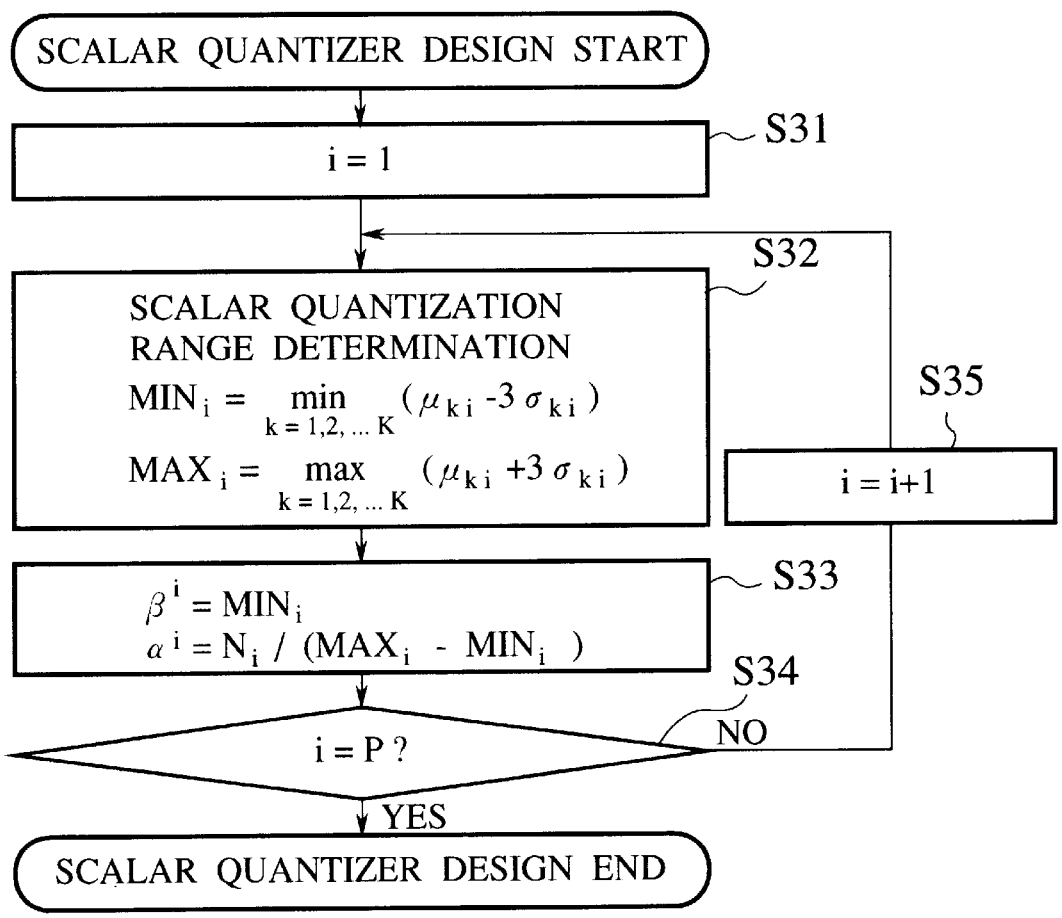
FIG. 16 is a flow chart for the operation of a scalar quantizer designing processing contained in the model training processing of FIG. 15.
Figure 17:
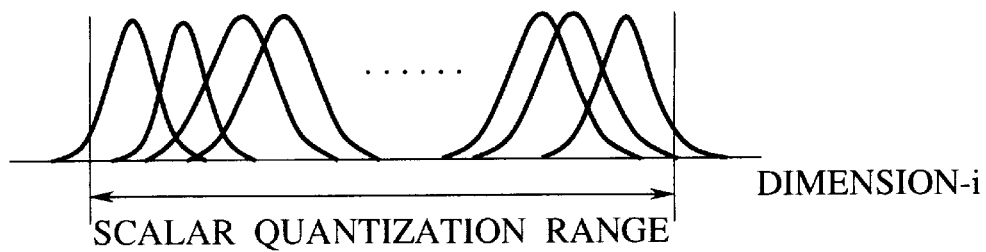
FIG. 17 is a diagram showing a scalar quantization range used in a course of the scalar quantizer designing processing of FIG. 16.

Namely, a variable i is initially set equal to 1 (step S31), and for each feature parameter dimension, a scalar quantization range is determined by checking an existence range of distributions (step S32), according to the above expression (6) as indicated in FIG. 16, where P is a total number of dimensions of the feature vector, K is a total number of continuous distributions in all models, and $\mu_{ki}$ and $\sigma_{ki}$ are a mean and a variance of the k-th distribution existing in the i-th dimension. Consequently, in this embodiment, values of $\mu \pm 3\sigma$ are obtained for all distributions in each dimension, and the scalar quantization range of that dimension is set as the maximum and minimum values among the obtained values of $\mu \pm 3\sigma$ as indicated in FIG. 17. Then, the scalar quantization range is divided by the quantization point number $N_i$ to determine the step width (step S33), where $\alpha^i$ is an inverse of the step width and $\beta^i$ is a bias. According to this scalar quantizer designing processing, a scalar quantization code is to be obtained as $\text{int}\{\alpha^i \, (o_t^i - \beta^i)\}$ ($o_t^i$ is an input value and $\text{int}\{\}$ is an integer calculation). The above processing of the steps S32 and S33 is repeated by sequentially incrementing the variable i until the variable i becomes P that is the total number of dimensions of the feature parameter by means of the steps S34 and S35.

Note that, in this embodiment, the values of $\mu \pm 3\sigma$ are obtained, but the present invention is not necessarily limited to this particular case.

Note also that, in this embodiment, the scalar quantizer is designed for each dimension separately, but it is also possible to design one scalar quantizer that can be commonly used for all the dimensions. In that case, a memory region required for the scalar quantizer can be reduced. Alternatively, it is also possible to design the scalar quantizer that can be shared among a part of distributions or models. By increasing a number of scalar quantizers, it becomes possible to obtain more detailed distribution. Also, the linear (constant step width) scalar quantization for dividing the quantization range evenly is carried out in this embodiment, but it is also possible to carry out the non-linear scalar quantization using irregular step widths. The non-linear scalar quantization can use shorter quantization step widths for a range at which more data exist, so that more detailed distribution shape expression becomes possible.

Figure 15:
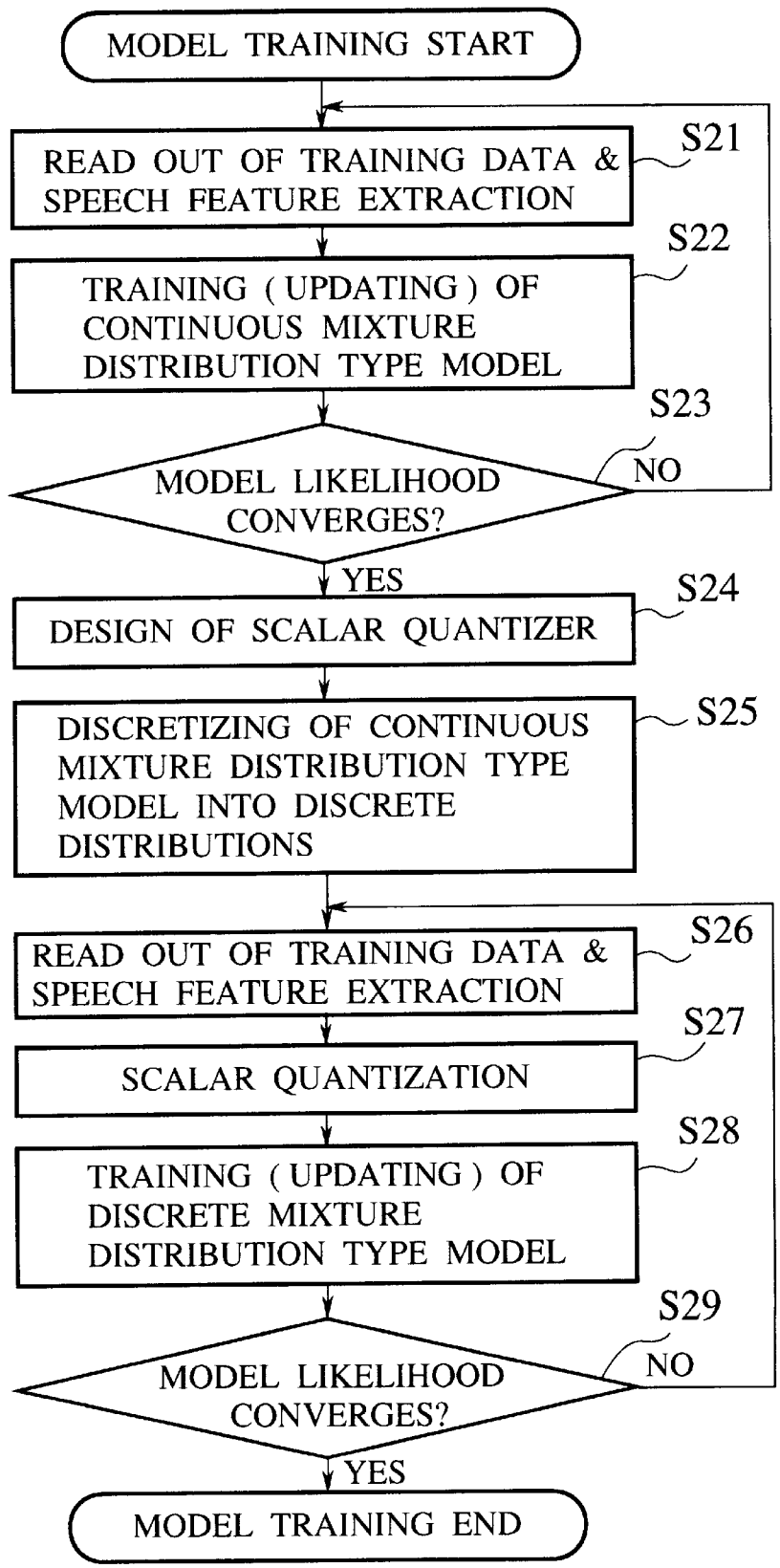
FIG. 15 is a flow chart for the operation of a model training processing by the pattern recognition apparatus of FIG. 13.

Next, the trained continuous distributions are discretized into the discrete distributions (step S25 of FIG. 15). Namely, for the scalar quantization points existing in $\mu \pm 3\sigma$ ($\mu$ is a mean and $\sigma$ is a variance) of each continuous distribution, the probability densities of the Gaussian distribution are calculated according to the above equation (2). Here, a sum of the probability densities is normalized to 1.0.

Then, setting the discrete mixture distribution obtained up to this point as an initial distribution, the training (optimization) of the model parameters using the training data is carried out. Here, the speech feature vector is obtained by the speech feature vector extraction unit 48 (step S26 of FIG. 15), and its each dimension element is scalar quantized by using the scalar quantizer designed at the step S24 so as to obtain the scalar quantization codes (step S27 of FIG. 15). Then, using the obtained scalar quantization codes, the output probability distributions in the discrete mixture distribution type model are estimated by the model parameter estimation unit 410 by using the maximum likelihood re-estimation method (step S28 of FIG. 15). The procedure for this processing is the same as indicated by the above equations (7) to (9). Note that the re-estimation formulae for the state transition probability and the mixture coefficients are the same as those in a case of the continuous mixture distribution.

The likelihood of the model with respect to the training data is gradually improved by each parameter updating by the maximum likelihood re-estimation. For each model, this parameter updating is to be continued until an update of the model likelihood with respect to the training data meets the predetermined criteria (steps S26 to S29). Finally, the probability value of each scalar quantization code in each distribution, that is a value expressing a shape of the one-dimensional discrete distribution, is stored in the model parameter memory 44, and the training is terminated.

Next, the pattern recognition processing in the pattern recognition apparatus of FIG. 13 is carried out according to the flow chart of FIG. 18 as follows.

Namely, the data to be recognized in a form of speech signals are entered from the speech signal input terminal 41 (step S41), and converted into the digital signals at the A/D conversion unit 42 (step S42). Then, the speech feature vectors (input feature vectors) are extracted by the speech feature vector extraction unit 43 (step S43).

The elements of the input feature vector are then scalar quantized (step S44), and probabilities with respect to distributions existing in the recognition target model are calculated (step S45). Here, the scalar quantization code book of each dimension of each distribution is referred according to the scalar quantization code and a product of the probabilities of all dimensions is calculated according to the above equation (4) as a probability of the input feature vector with respect to each mixture component distribution. This calculation process is shown in FIG. 14 described above.

Then, in order to obtain a probability of each state, a sum of the probabilities for all the mixture component distributions within the state is calculated according to the above equation (5). Here it is also possible to use the highest probability among all the distributions as the probability of the state instead of using a sum of the probabilities of all the distributions. Finally, the model with the highest probability is selected (step S46), and the category corresponding to the model with the highest probability is outputted (step S47).

Note that, for speech recognition, the feature vectors include the spectrum feature parameters of speech derived by the Linear Predictive Coding (LPC) analysis such as LPC coefficients, LPC cepstrum parameters, mel-LPC cepstrum parameters, and line spectrum pair (LSP) parameters. Furthermore, the feature vectors include spectrum feature parameters based on the Fast Fourier Transform (FFT) analysis such as the FFT cepstrum parameters, mel-frequency FFT cepstrum parameters, and FFT filter band coefficients.

Note also that, in this embodiment, a case of the speech input has been described, but the present invention is widely applicable to the pattern recognition of other types of data such figures, characters, etc. For example, in a case of a handwritten character recognition, the recognition target characters can be modelled by the probabilistic models using a stroke strength and a direction vector at each time in a course of writing a character as the feature vectors. In a case of the figure recognition, dot patterns of regions that divide a image field can be used as the feature vectors.

Note also that, in this embodiment, each dimension is linearly scalar quantized (i.e., quantized by the constant step width), but it is also possible to use the non-linear scalar quantization. By using the shorter quantization step widths for a region at which training data samples are concentrated, more detailed distribution shape can be obtained. In order to determine the quantization codes in the non-linear quantization, it is basically necessary to calculate distances with respect to all the quantization points, but these distances can be obtained efficiently by using the quantization code book described by the tree structure. Here, the tree structure can be obtained as follows.

First, a set of all the quantization points is placed at a root of the tree. Then, the quantization points are grouped according to the distances among the quantization points, and as many branches as the number of groups are extended from the root node and each group is placed at the end of each branch. Similarly more branches are extended from the end of each branch and groups of quantization points that are nearer to each other are allocated to them. This procedure is repeated until each end of the branch is allocated with one quantization point. Then, for each group of the quantization points, a representative point is specified. This completes the three structure of the quantization points. For the input data, the distances with respect to as many representative points as the number of branches are calculated at each branching point, and the branch with the shortest distance is selected. This process is repeated until an end of the tree is reached, so as to obtain the quantization code allocated at the reached end. In this manner, the quantization code can be obtained efficiently without being required to calculate distances with respect to all the quantization points.

Next, with references to FIG. 19 and FIG. 20, the result of experiments on the telephone speech recognition based on the above described embodiment will be described in order to demonstrate the effectiveness of the present invention.

In the experiment, the performances of the discrete mixture distribution type model according to the present invention and the conventional continuous mixture distribution type model were compared. They were evaluated by using both the context independent phoneme model and the context dependent phoneme model. In the context independent phoneme model, 27 phonemes with 3 states per phoneme were used, and the training data were 7,192 sentences uttered by 800 males and females. The evaluation data were names of 100 cities each uttered by 9 males and 4 females. In the context dependent phoneme model, the evaluation was made by using only the male speech data. The structure of the model was a 412 states HMnet type. The feature vectors is the 26-dimensional vector containing 12-th order LPC cepstrum, $\Delta$ cepstrum, and $\Delta$ power. The bandwidth was limited to 300 Hz to 3400 Hz, and the cepstrum mean normalization (CMN) was applied for the purpose of removing the telephone line distortion. The number of scalar quantization points of each dimension of the discrete mixture distribution type model was set to be 16.

Figure 19:
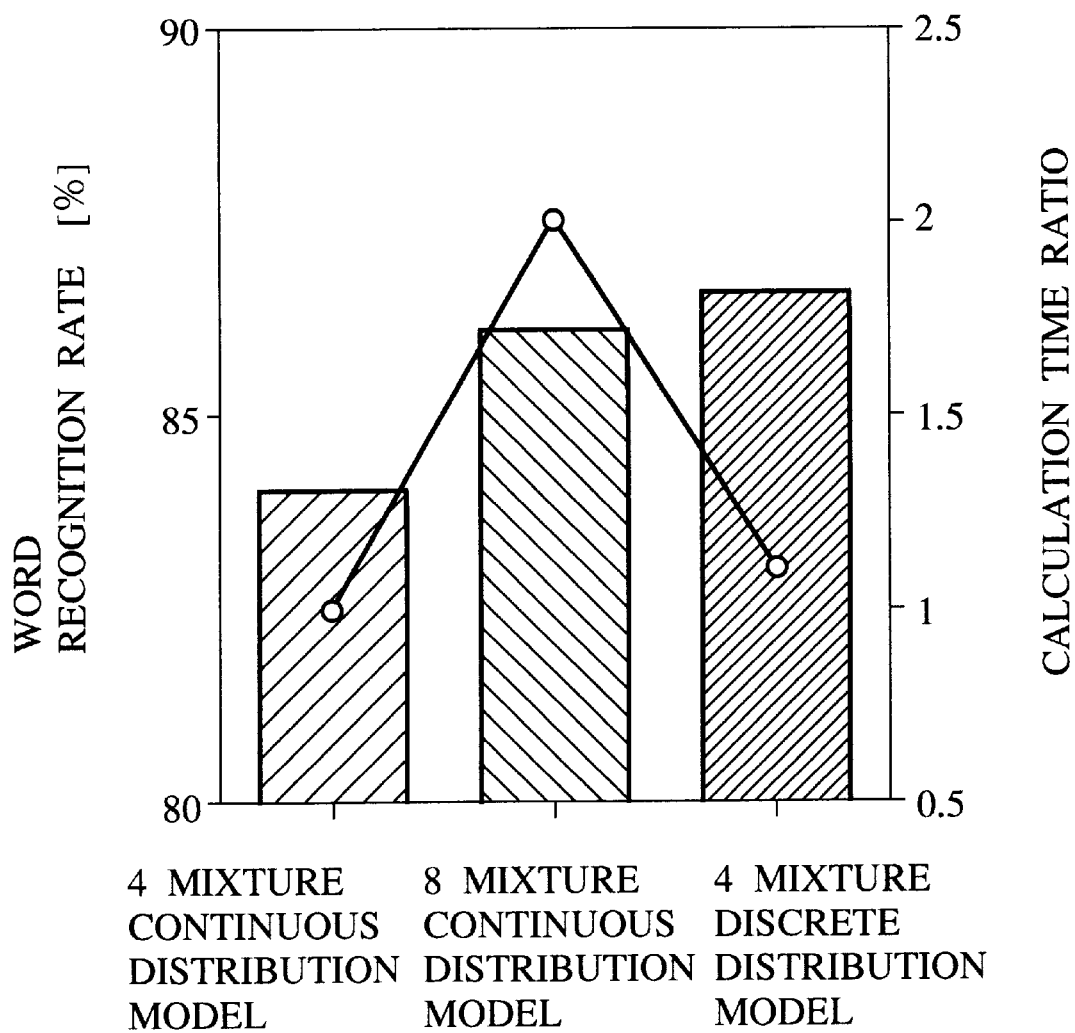
FIG. 19 is a graph showing a result of experiment for comparing the pattern recognition scheme of the present invention with a conventional pattern recognition scheme, for a case of context independent phoneme model.

First, the result of experiment for the context independent phoneme model is shown in FIG. 19. Here, the recognition vocabulary includes 100 words. When the continuous mixture type HMM and the discrete mixture type HMM of the same 4 mixture model are compared, it can be seen that the higher performance can be obtained by the discrete mixture type. Namely, as indicated by bars in FIG. 19, the recognition rate of the continuous mixture type HMM was 84% (an error rate of 16%), while the recognition rate of the discrete mixture type HMM was 86.5%, so that the error rate was reduced by 2.5%. In the speech recognition, the absolute value of the recognition rate varies according to the size and the difficulty of the word set to be recognized. However, it is generally confirmed that almost the same error reduction rate can be obtained in a case of introducing a new technology or model regardless of the word set used. Consequently, the error reduction rate that can be achieved in the case of introducing the discrete mixture type HMM can be calculated according to the error rate in the case of using the continuous mixture type MM as 16% (2.5/16= 0.16). This is the significant error reduction rate due to the improvement of the acoustic model.

Next, the calculation times required for the output probability calculation are compared. It was found that, in order to obtain the same performance as the 4 mixture model of the discrete mixture type HMM, it is necessary to use the 8 mixture model of the continuous mixture type HMM. As indicated by dots in FIG. 19, when the calculation time required by the 4 mixture model of the continuous mixture type HMM is set as 1.0, the calculation time required by the 8 mixture model of the continuous mixture type HMM was twice as long. In contrast, the calculation time required by the 4 mixture model of the discrete mixture type HMM was only 1.1. In other words, the calculation time required in order to obtain the same performance was reduced to one half. Note that the calculation program of the continuous mixture type HMM is already sufficiently optimized, but there is still a room for improvement in the calculation program of the discrete mixture type HMM, so that there is a possibility of shortening the calculation time further.

Figure 20:
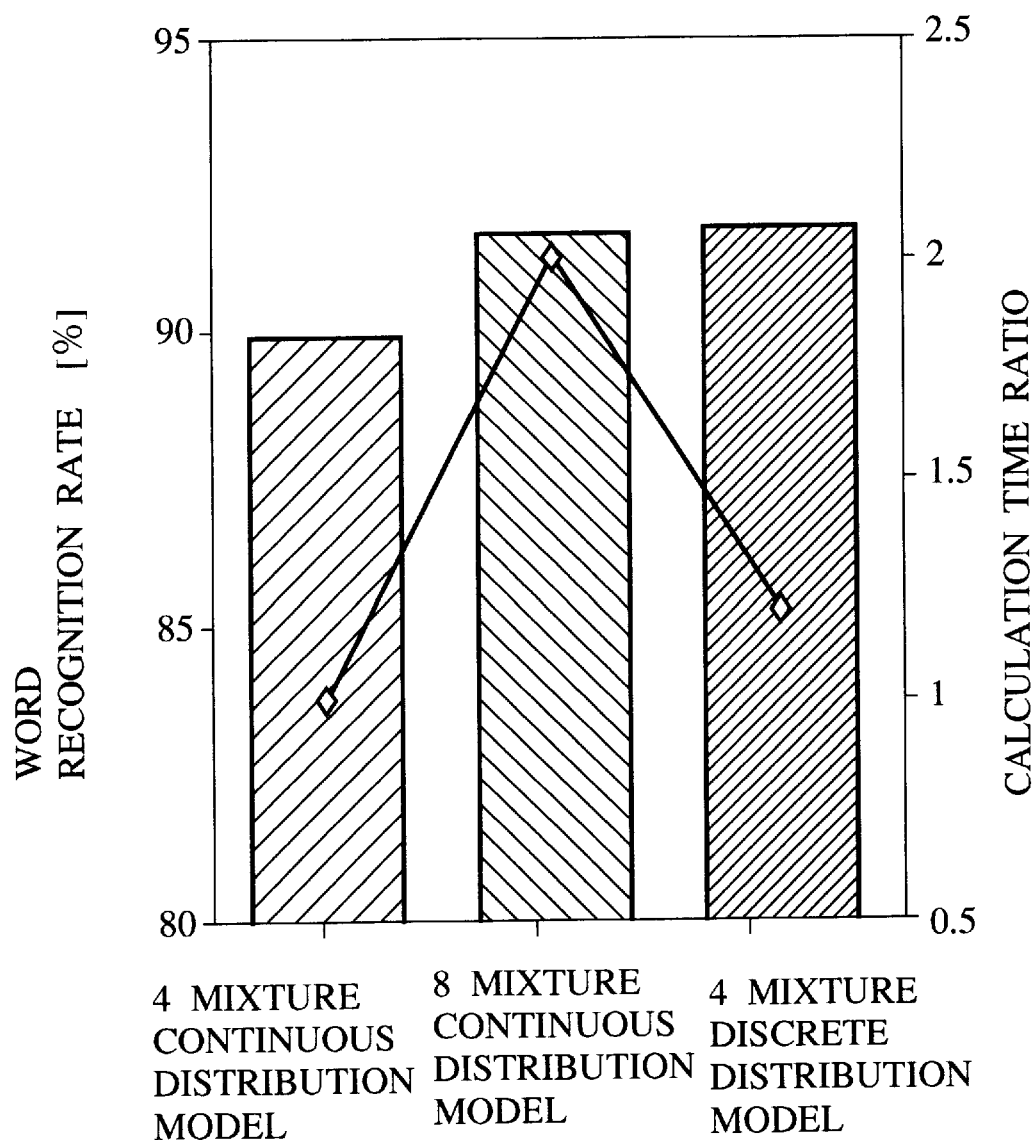
FIG. 20 is a graph showing a result of experiment for comparing the pattern recognition scheme of the present invention with a conventional pattern recognition scheme, for a case of context dependent phoneme model.

Next, the result of experiment on the context dependent phoneme model is shown in FIG. 20. Here, the recognition vocabulary includes 1200 words. In this case, the result with the similar tendency as in the result shown in FIG. 19 for the context independent phoneme model was obtained.

As should be apparent from these results of experiments, when the same calculation time was used, there was possible an improvement in that the higher recognition performance than the prior art can be obtained. Also, there was an improvement in that the calculation time required in order to obtain the same recognition performance can be reduced by about 50%.

Figure 21:
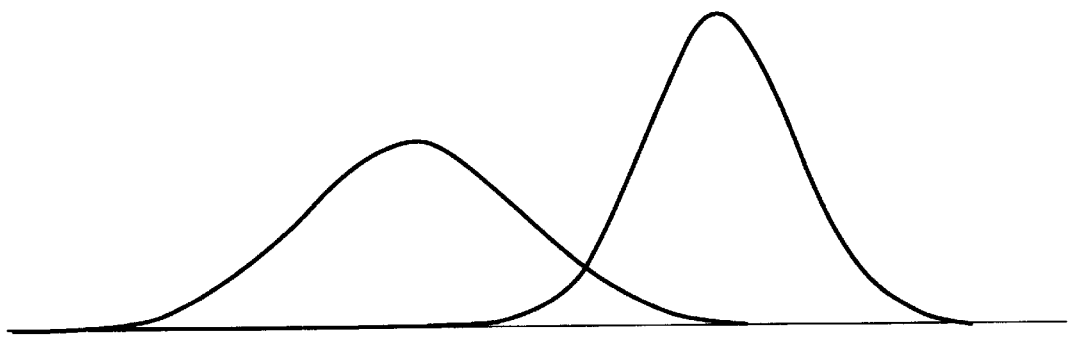
FIG. 21 is a diagram showing an exemplary set of Gaussian distributions before the merging according to another embodiment of the present invention.
Figure 22:
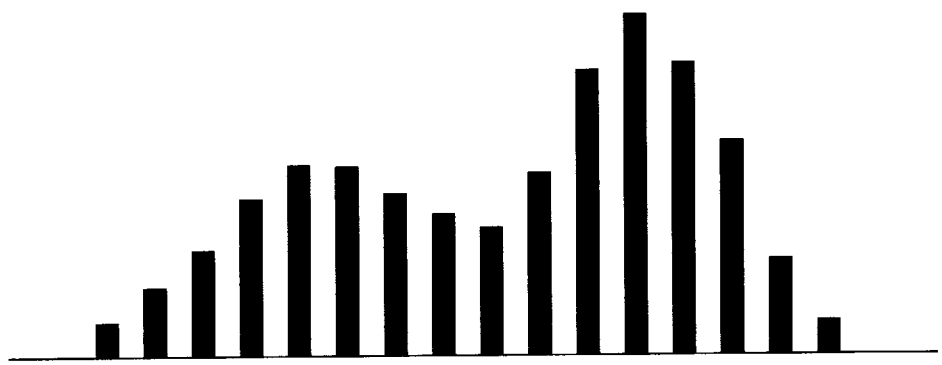
FIG. 22 shows a discrete distribution after the merging that results from the continuous distributions of FIG. 21 according to another embodiment of the present invention.

Next, with references to FIG. 21 and FIG. 22, another embodiment of the pattern recognition scheme according to the present invention will be described in detail.

This embodiment is directed to a case of generating the initial model of the discrete mixture distribution type HMM from the continuous mixture distribution type HMM with a number of mixture distributions which is greater than a desired number of distributions to be mixed. This embodiment differs from the previous embodiment in that the initial model generation processing is modified as described below, while the apparatus configuration and the other operations remain substantially the same as in the previous embodiment.

In this embodiment, the initial model generation processing is carried out as follows.

First, the continuous mixture distribution type HMM with a number of mixed distribution greater than a desired number of distributions to be mixed is trained.

Then, among the continuous distributions on the multi-dimensional space, clusters of distributions are formed by close distributions which have little influence even when they are merged. Here, a number of clusters is set equal to a required number of distributions to be mixed in the discrete mixture distribution type HMM. The criterion for the clustering can be a distance between the distributions such as the Kullback information, for example. The Kullback information can calculate a distance between two distributions according to an overlap between these two distributions.

Finally, one discrete distribution is formed from a plurality of continuous distributions within the cluster. Assuming that the multi-dimensional Gaussian distribution is a diagonal Gaussian distribution without correlations among the dimensions, the merging of the distributions can be carried out in each dimension independently. FIG. 21 shows an exemplary set of Gaussian distributions before the merging, while FIG. 22 shows a discrete distribution after the merging that result from the continuous distributions of FIG. 21.

This embodiment is effective when there is a sufficient amount of training data, because in such a case the continuous distribution type model with more number of mixture distributions can express the feature vector distributions more accurately than the continuous distribution type model with less number of mixture distributions so that the higher performance can be realized. For this reason, it is possible to provide more appropriate initial distributions by generating the initial model according to the continuous distribution type model with more number of mixed distributions.

Note also that the algorithm used for the training of the HMM is affected by the initial value, and there is a possibility for falling into a local optimal point, but it is impossible to obtain the sufficient performance from the local optimal point. In this regard, by using the scheme of this embodiment, it becomes possible to provide more appropriate initial value, and therefore there is an advantage in that the high performance can be obtained constantly regardless of the training conditions. In addition, there is also an advantage in that the convergence of the training becomes quicker in this embodiment.

As described, according to the pattern recognition scheme of the present invention, the non-parametric discrete distribution is used as each mixture component distribution, so that the higher expressive power than the continuous distribution (parametric distribution) can be obtained, and the calculation cost is lower than the continuous distribution. Therefore it is possible to realize the model with the reduced cost for calculation of the output probability while maintaining the same recognition performance as the continuous distribution case. In other words, the expressive power of each mixture component distribution is higher than the prior art so that it is possible realize the recognition performance higher than that realizable by the conventional model with the same number of mixture distributions.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

Figure 18:
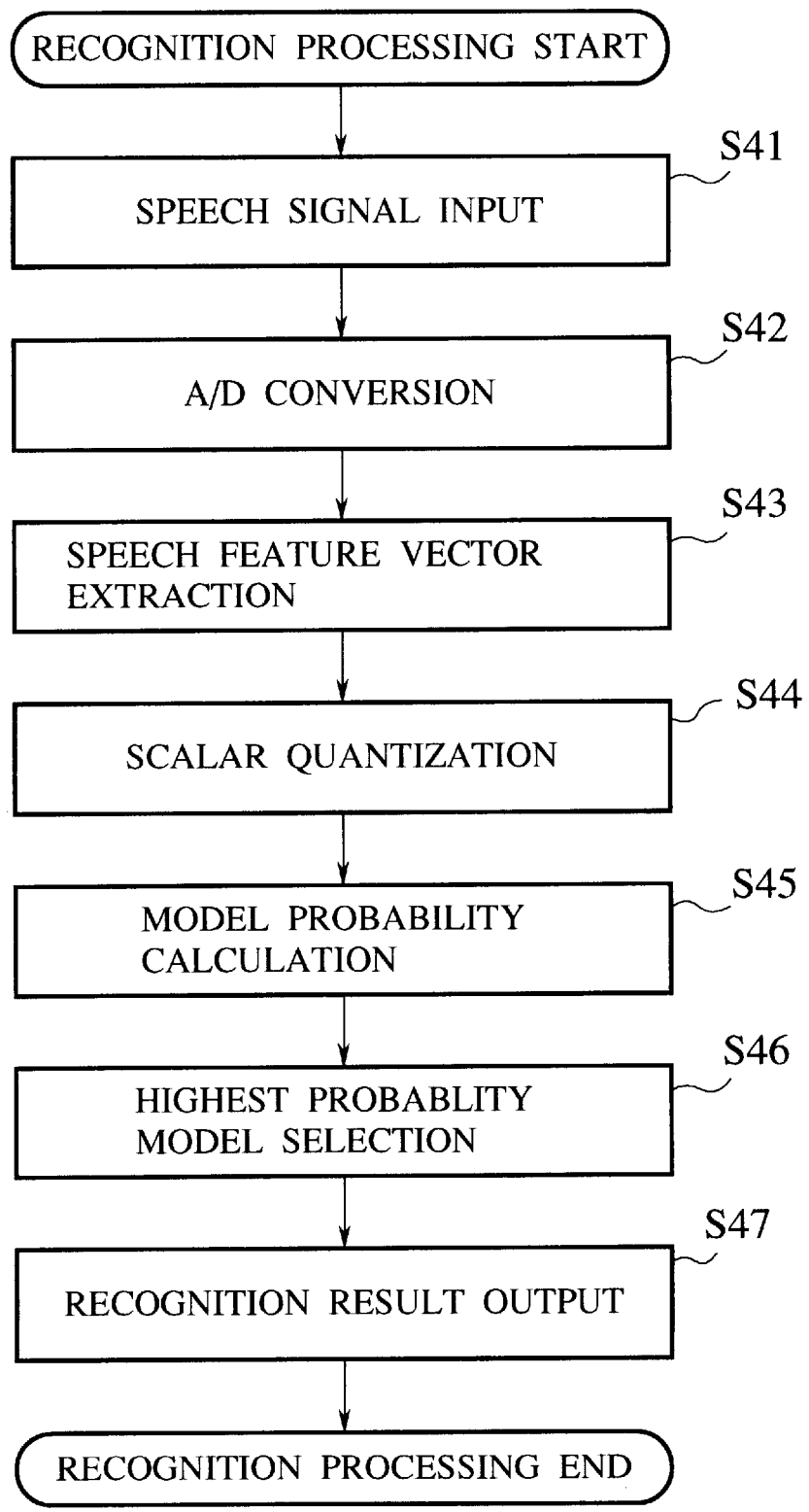
FIG. 18 is a flow chart for the operation of a pattern recognition processing by the pattern recognition apparatus of FIG. 13.

In particular, the initial model generation processing of FIG. 15 and the pattern recognition processing of FIG. 18 described above can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A pattern recognition method, comprising the steps of:

calculating a probability of each probabilistic model expressing features of each recognition category with respect to each input feature vector derived from each input signal, wherein the probabilistic model represents a feature parameter subspace in which feature vectors of each recognition category exist and the feature parameter subspace is expressed by using mixture distributions of one-dimensional discrete distributions with arbitrary distribution shapes which are arranged in respective dimensions; and outputting a recognition category expressed by a probabilistic model with a highest probability among a plurality of probabilistic models as a recognition result.

2. The method of claim 1, wherein the calculating step includes the steps of:

obtaining a scalar quantization code by scalar quantizing a value of each dimension component of the input feature vector;

determining a probability of each dimension of each mixture component distribution by referring to a scalar quantization code book according to the scalar quantization code;

calculating a product of probabilities of all dimensions of each mixture component distribution as a probability of each mixture component distribution; and setting a sum or a maximum value of probabilities of all mixture component distributions within each state as a probability of each probabilistic model in each state with respect to the input feature vector.

3. The method of claim 1, wherein a scalar quantization code book for the discrete distributions is shared among distributions existing in all or a part of the probabilistic models.

4. The method of claim 1, wherein a scalar quantization code book for the discrete distributions is shared among distributions existing in an identical dimension of all or a part of the probabilistic models.

5. The method of claim 1, wherein the discrete distributions are distributions based on quantization points defined by a linear scalar quantization.

6. The method of claim 1, wherein the discrete distributions are distributions based on quantization points defined by a non-linear scalar quantization, and the quantization points are given in a tree structure.

7. The method of claim 1, further comprising the step of:

estimating parameters of the discrete distributions from training data, by first training a continuous distribution type model with a number of mixture component distributions equal to a desired number of distributions to be mixed in the mixture distribution, and then training a probabilistic model obtained by discretizing each continuous distribution of the continuous distribution type model as an initial model.

8. The method of claim 1, further comprising the step of:

estimating parameters of the discrete distributions from training data, by first training a continuous distribution type model with a number of mixture component distributions greater than a desired number of distributions to be mixed in the mixture distribution, then merging continuous distributions of the continuous distribution type model until a number of mixture component distributions becomes equal to the desired number of distributions, and then training a probabilistic model obtained by discretizing each continuous distribution of the continuous distribution type model after merging as an initial model.

9. The method of claim 1, wherein the probabilistic models are hidden Markov models.

10. The method of claim 1, wherein the input signal is a speech signal, the input feature vector expresses features of an input speech, and the recognition result indicates the recognition category for the input speech.

11. A pattern recognition apparatus, comprising:

a calculation unit for calculating a probability of each probabilistic model expressing features of each recognition category with respect to each input feature vector derived from each input signal, wherein the probabilistic model represents a feature parameter subspace in which feature vectors of each recognition category exist and the feature parameter subspace is expressed by using mixture distributions of one-dimensional discrete distributions with arbitrary distribution shapes which are arranged in respective dimensions; and a recognition unit for outputting a recognition category expressed by a probabilistic model with a highest probability among a plurality of probabilistic models as a recognition result.

12. The apparatus of claim 11, wherein the calculation unit includes:

a first unit for obtaining a scalar quantization code by scalar quantizing a value of each dimension component of the input feature vector;

a second unit for determining a probability of each dimension of each mixture component distribution by referring to a scalar quantization code book according to the scalar quantization code;

a third unit for calculating a product of probabilities of all dimensions of each mixture component distribution as a probability of each mixture component distribution; and a fourth unit for setting a sum or a maximum value of probabilities of all mixture component distributions within each state as a probability of each probabilistic model in each state with respect to the input feature vector.

13. The apparatus of claim 11, wherein the calculation unit uses a scalar quantization code book for the discrete distributions which is shared among distributions existing in all or a part of the probabilistic models.

14. The apparatus of claim 11, wherein the calculation unit uses a scalar quantization code book for the discrete distributions which is shared among distributions existing in an identical dimension of all or a part of the probabilistic models.

15. The apparatus of claim 11, wherein the calculation unit uses the discrete distributions which are distributions based on quantization points defined by a linear scalar quantization.

16. The apparatus of claim 11, wherein the calculation unit uses the discrete distributions are distributions based on quantization points defined by a non-linear scalar quantization, and the quantization points are given in a tree structure.

17. The apparatus of claim 11, further comprising:

a training unit for estimating parameters of the discrete distributions from training data, by first training a continuous distribution type model with a number of mixture component distributions equal to a desired number of distributions to be mixed in the mixture distribution, and then training a probabilistic model obtained by discretizing each continuous distribution of the continuous distribution type model as an initial model.

18. The apparatus of claim 11, further comprising:

a training unit for estimating parameters of the discrete distributions from training data, by first training a continuous distribution type model with a number of mixture component distributions greater than a desired number of distributions to be mixed in the mixture distribution, then merging continuous distributions of the continuous distribution type model until a number of mixture component distributions becomes equal to the desired number of distributions, and then training a probabilistic model obtained by discretizing each continuous distribution of the continuous distribution type model after merging as an initial model.

19. An article of manufacture, comprising:

a computer usable medium having computer readable program code means embodied therein for causing a computer to function as a pattern recognition system, the computer readable program code means including:

first computer readable program code means for causing said computer to calculate a probability of each probabilistic model expressing features of each recognition category with respect to each input feature vector derived from each input signal, wherein the probabilistic model represents a feature parameter subspace in which feature vectors of each recognition category exist and the feature parameter subspace is expressed by using mixture distributions of one-dimensional discrete distributions with arbitrary distribution shapes which are arranged in respective dimensions; and second computer readable program code means for causing said computer to output a recognition category expressed by a probabilistic model with a highest probability among a plurality of probabilistic models as a recognition result.

20. The article of manufacture of claim 19, wherein the first computer readable program code means includes:

a first computer readable sub-program code means for obtaining a scalar quantization code by scalar quantizing a value of each dimension component of the input feature vector;

a second computer readable sub-program code means for determining a probability of each dimension of each mixture component distribution by referring to a scalar quantization code book according to the scalar quantization code;

a third computer readable sub-program code means for calculating a product of probabilities of all dimensions of each mixture component distribution as a probability of each mixture component distribution; and a fourth computer readable sub-program code means for setting a sum or a maximum value of probabilities of all mixture component distributions within each state as a probability of each probabilistic model in each state with respect to the input feature vector.

21. The article of manufacture of claim 19, wherein the first computer readable program code means uses a scalar quantization code book for the discrete distributions which is shared among distributions existing in all or a part of the probabilistic models.

22. The article of manufacture of claim 19, wherein the first computer readable program code means uses a scalar quantization code book for the discrete distributions which is shared among distributions existing in an identical dimension of all or a part of the probabilistic models.

23. The article of manufacture of claim 19, wherein the first computer readable program code means uses the discrete distributions which are distributions based on quantization points defined by a linear scalar quantization.

24. The article of manufacture of claim 19, wherein the first computer readable program code means uses the discrete distributions are distributions based on quantization points defined by a non-linear scalar quantization, and the quantization points are given in a tree structure.

25. The article of manufacture of claim 19, further comprising:

a third computer readable program code means for causing said computer to estimate parameters of the discrete distributions from training data, by first training a continuous distribution type model with a number of mixture component distributions equal to a desired number of distributions to be mixed in the mixture distribution, and then training a probabilistic model obtained by discretizing each continuous distribution of the continuous distribution type model as an initial model.

26. The article of manufacture of claim 19, further comprising:

a third computer readable program code means for causing said computer to estimate parameters of the discrete distributions from training data, by first training a continuous distribution type model with a number of mixture component distributions greater than a desired number of distributions to be mixed in the mixture distribution, then merging continuous distributions of the continuous distribution type model until a number of mixture component distributions becomes equal to the desired number of distributions, and then training a probabilistic model obtained by discretizing each continuous distribution of the continuous distribution type model after merging as an initial model.

27. A pattern recognition apparatus, comprising:

an A/D conversion unit for converting input speech signals into digital signals;

an input speech feature vector extraction unit for extracting an input speech feature vector from the digital signals converted by the A/D conversion unit;

a model training speech data storage unit for storing model training speech data;

a model training speech feature vector extraction unit for extracting model training speech feature vectors from the model training speech data stored in the model training speech data storage unit;

an initial model generation unit for generating initial models of discrete mixture distribution type models by carrying out a training of continuous mixture distribution type models using the model training speech feature vectors extracted by the model training speech feature vector extraction unit;

a model parameter estimation unit for estimating model parameters of the discrete mixture distribution type models using the model training speech feature vectors extracted by the model training speech feature vector extraction unit, with discrete mixture distributions of the initial models generated by the initial model generation unit as initial distributions;

a model parameter memory unit for storing the model parameters obtained by the model parameter estimation unit;

a model probability calculation unit for calculating a probability of the input speech feature vector with respect to each discrete mixture distribution type model according to the model parameters stored in the model parameter memory unit; and a recognition result output unit for outputting a recognition category expressed by a discrete mixture distribution type model with a highest probability calculated by the model probability calculation unit among the discrete mixture distribution type models as a recognition result.

28. A pattern recognition method, comprising the steps of:

(a) converting input speech signals into digital signals;

(b) extracting an input speech feature vector from the digital signals converted by the step (a);

(c) storing model training speech data;

(d) extracting model training speech feature vectors from the model training speech data stored by the step (c);

(e) generating initial models of discrete mixture distribution type models by carrying out a training of continuous mixture distribution type models using the model training speech feature vectors extracted by the step (d);

(f) estimating model parameters of the discrete mixture distribution type models using the model training speech feature vectors extracted by the step (d), with discrete mixture distributions of the initial models generated by the step (e) as initial distributions;

(g) storing the model parameters obtained by the step (f);

(h) calculating a probability of the input speech feature vector with respect to each discrete mixture distribution type model according to the model parameters stored by the step (g); and (i) outputting a recognition category expressed by a discrete mixture distribution type model with a highest probability calculated by the step (h) among the discrete mixture distribution type models as a recognition result.

* * * * *